US006823080B2

(12) United States Patent
Iijima et al.

(10) Patent No.: US 6,823,080 B2
(45) Date of Patent: Nov. 23, 2004

(54) THREE-DIMENSIONAL INFORMATION PROCESSING APPARATUS AND METHOD

(75) Inventors: Katsumi Iijima, Hachioji (JP); Shigeki Okauchi, Kodaira (JP); Masakazu Matsugu, Chiba (JP); Masayoshi Sekine, Tokyo (JP); Kotaro Yano, Yokohama (JP); Sunao Kurahashi, Kawasaki (JP); Tatsushi Katayama, Tokyo (JP); Katsuhiko Mori, Kwawsaki (JP); Motohiro Ishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/206,596

(22) Filed: Jul. 29, 2002

(65) Prior Publication Data

US 2003/0007680 A1 Jan. 9, 2003

Related U.S. Application Data

(62) Division of application No. 08/885,823, filed on Jun. 30, 1997, now Pat. No. 6,445,814.

(30) Foreign Application Priority Data

| Jul. 1, 1996 | (JP) | 8-189972 |
| Jul. 4, 1996 | (JP) | 8-192727 |
| Jul. 5, 1996 | (JP) | 8-194102 |

(51) Int. Cl.[7] ............................................. G06K 9/00
(52) U.S. Cl. .................... 382/154; 382/312; 382/305; 348/42; 359/462; 352/86; 356/12
(58) Field of Search ........................... 382/153, 154, 382/190, 195, 203, 201, 312, 305; 348/42, 46, 50, 51; 359/462; 352/86, 2; 356/2, 12, 375, 376

(56) References Cited

U.S. PATENT DOCUMENTS

| 4,573,191 A | * | 2/1986 | Kidode et al. .............. 382/106 |
| 4,654,872 A | | 3/1987 | Hisano et al. .................. 382/1 |
| 4,692,806 A | * | 9/1987 | Anderson et al. ....... 375/240.08 |
| 4,731,853 A | | 3/1988 | Hata et al. ...................... 382/1 |
| 4,858,157 A | | 8/1989 | Murai et al. ................ 364/560 |
| 4,870,600 A | | 9/1989 | Hiraoka ....................... 364/522 |
| 4,873,651 A | * | 10/1989 | Raviv .......................... 700/259 |
| 4,982,438 A | | 1/1991 | Usami et al. ................. 382/25 |
| 5,102,223 A | | 4/1992 | Uesugi et al. .............. 356/376 |
| 5,249,035 A | * | 9/1993 | Yamanaka ................... 356/611 |
| 5,255,064 A | | 10/1993 | Maekawa ....................... 356/1 |
| 5,589,942 A | | 12/1996 | Gordon ....................... 250/558 |
| 5,675,377 A | | 10/1997 | Gibas .......................... 348/47 |
| 5,737,084 A | | 4/1998 | Ishihara ..................... 356/376 |
| 5,764,786 A | | 6/1998 | Kuwashima et al. ........ 382/107 |
| 5,790,713 A | | 8/1998 | Kamada et al. ............. 345/355 |
| 5,793,900 A | | 8/1998 | Nourbakhsh et al. ....... 382/263 |
| 5,831,619 A | * | 11/1998 | Nakagawa et al. ......... 345/419 |
| 5,917,937 A | * | 6/1999 | Szeliski et al. ............. 382/154 |
| 5,923,773 A | | 7/1999 | Oshima ...................... 382/154 |
| 5,930,383 A | | 7/1999 | Netzer ........................ 382/154 |
| 6,389,179 B1 | * | 5/2002 | Katayama et al. .......... 382/284 |

OTHER PUBLICATIONS

Large–Screen–Projection, Avionic, and Helmet–Mounted Displays; Harry M. Assenheim, et al.; Feb. 26–28, 1991; Vol. 1456; SPIE—The International Society for Optical Engineering.

* cited by examiner

Primary Examiner—Bhavesh M. Mehta
Assistant Examiner—Sheela Chawan
(74) Attorney, Agent, or Firm—Morgan & Finnegan, LLP

(57) ABSTRACT

A three-dimensional information processing apparatus for obtaining three-dimensional information from an object having a three-dimensional shape, and performing predetermined information processing, comprises: a camera for sensing images of the object from a plurality of coordinate positions using an image sensing system having one or a plurality of optical systems. A plurality of depth information are extracted from image sensing related information sensed by the camera at the plurality of coordinate positions, and the plurality of extracted depth information are converted and unified into depth information expressed by a unified coordinate system.

35 Claims, 31 Drawing Sheets

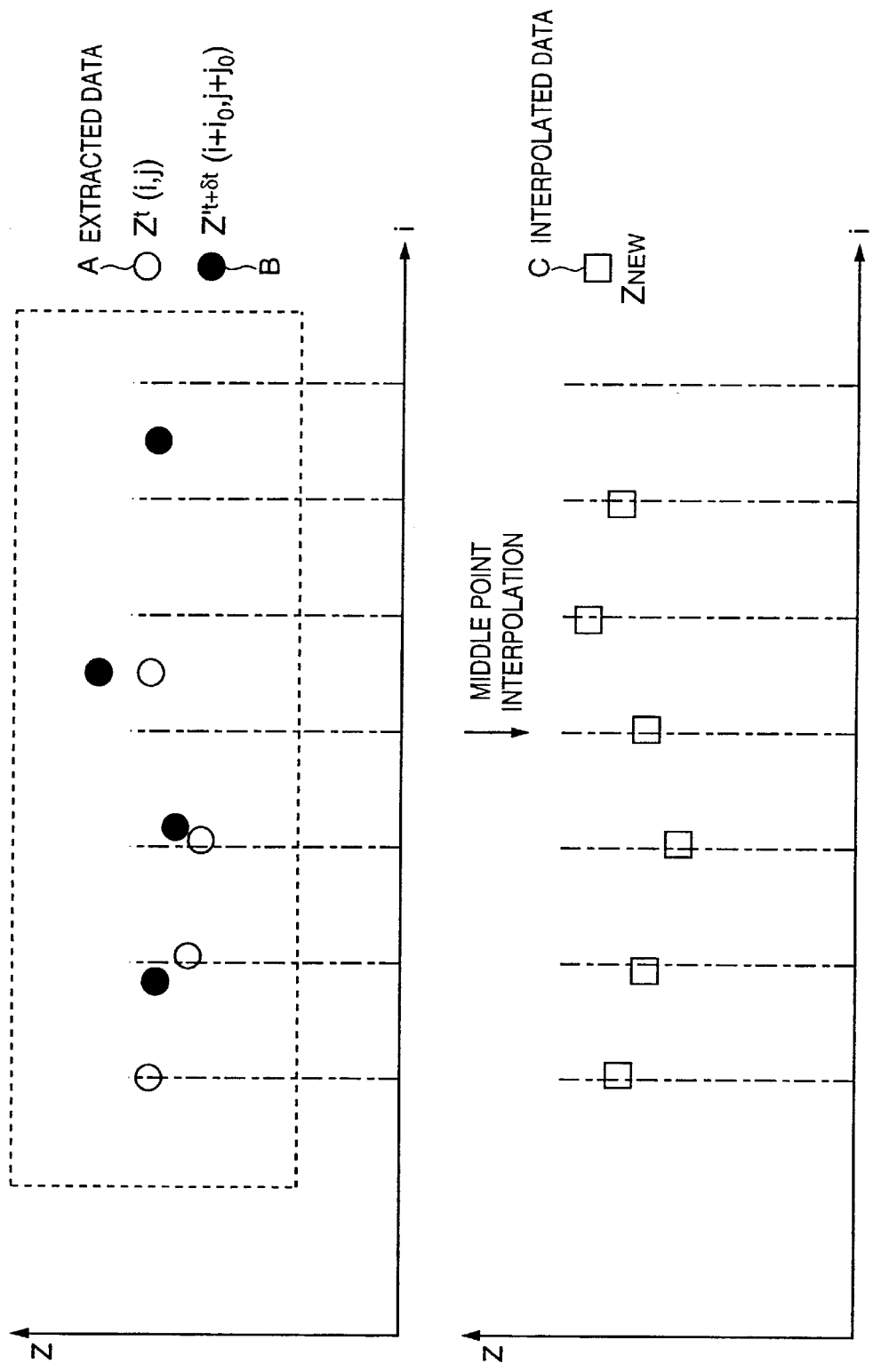

FIG. 19

| RESIDUAL | | |
|---|---|---|
| 0 ~ 2 | 2 ~ 4 | 4 ~ |
| 3 | 2 | 0 |

FIG. 20

| | | OBJECT ANGLE | | | |
|---|---|---|---|---|---|
| | | 0 ~ 30° | 30 ~ 60° | 60 ~ 80° | 80 ~ 90° |
| RESIDUAL | 0 ~ 2 | 3 | 2 | 1 | 0 |
| | 2 ~ 4 | 3 | 2 | 0 | 0 |

FIG. 24

|  | | OBJECT ANGLE | | | |
|---|---|---|---|---|---|
|  | | 0 ~ 30° | 30 ~ 60° | 60 ~ 80° | 80 ~ 90° |
| OBJECT DISTANCE | 10 ~ 30 cm | 3 | 2 | 2 | 1 |
| | 30 ~ 60 cm | 2 | 2 | 1 | 0 |
| | 60 cm ~ | 2 | 1 | 1 | 0 |

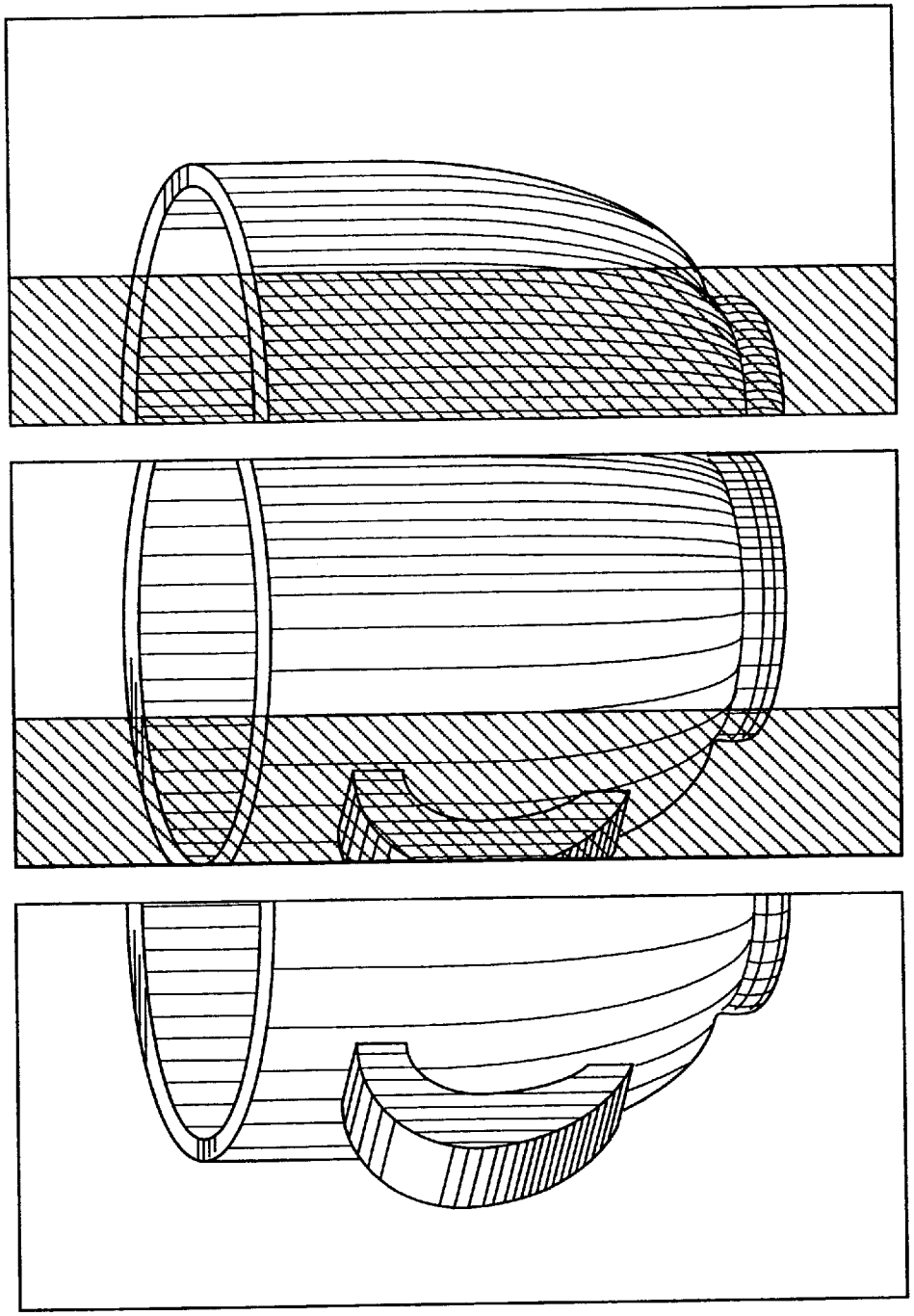

THREE-DIMENSIONAL INFORMATION PROCESSING APPARATUS AND METHOD

This is divisional of co-pending application Ser. No. 08/885,823, filed Jun. 30, 1997 and now U.S. Pat. No. 6,445,814.

BACKGROUND OF THE INVENTION

The present invention relates to a three-dimensional information processing apparatus and method for extracting three-dimensional information, that can be used in CG, CAD, and the like, from an object having a three-dimensional shape.

As a conventional technique for obtaining the three-dimensional shape of an object, for example, "Stereoscopic matching using a plurality of base line distances" (*Journal of Papers of the Institute of Electronics, Information and Communication Engineers* D-II, Vol. J75-D-II, No. 8, pp. 1317–1327, August 1992) is known. Generally, the conventional method of acquiring a three-dimensional shape can be roughly classified into passive and active methods.

One typical passive method is a stereoscopic image method, which utilizes trigonometric measurements using two cameras. In this method, the positions of images of an identical object are detected from right and left images taken by cameras, and the three-dimensional position of the object is measured based on the displacement amount between the detected positions.

As typical active methods, an optical radar type range finder which obtains distance by measuring the time until light projected toward and reflected by an object returns, a slit light projection method for projecting a slit-shaped light pattern onto an object, and measuring the three-dimensional shape on the basis of the displacement of the pattern shape formed on the object, and the like are known.

Note that the three-dimensional data of the object obtained by the above-mentioned methods can be reproduced and displayed on, e.g., a two-dimensional display.

However, the stereoscopic image method has as its major objective to calculate the distance information from a specific position where the cameras are set to the object, and does not measure the three-dimensional shape itself of a certain object. In the active methods, since a laser beam or the like must be irradiated onto the object, it is cumbersome to use such methods.

For this reason, such methods cannot flexibly cope with a dynamic image sensing environment, i.e., image sensing while moving around a certain object, and hence, none of the conventional methods can extract depth information in such dynamic image sensing environment.

Images normally used in an office are often finally output onto paper sheets, and images types to be used include both natural images and line images that express objects by edge lines alone. More specifically, in an office or the like, it is a common practice to process image information for various purposes.

In contrast to this, since the principal object of the above-mentioned prior art is to calculate the three-dimensional shape data of the object from certain specific setting positions of the cameras and to faithfully display the calculated data on a two-dimensional display, the above-mentioned methods cannot cope with various kinds of image processing required in, e.g., an office.

More specifically, the present invention is addressed to a three-dimensional information extraction apparatus which can be easily applied to a dynamic image sensing environment in which the image sensing position changes, and can process acquired three-dimensional information into various forms.

Some stereoscopic image processing apparatuses use three or more images in place of two images, and form three-dimensional shapes by unifying shape information obtained from such images.

Upon judging the reliability of the obtained three-dimensional shape, for example, the above-mentioned stereoscopic image method uses the comparison result or correlation of residuals obtained upon calculating the position displacement amount by corresponding point extraction of the luminance values in place of reliability judgment.

However, in the above-mentioned prior arts, in the case of, e.g., the stereoscopic image method, even when the residual is large or when the correlation function is small, if the angle the object makes with the image sensing plane is large or the distance from the apparatus to the object is large, calculation errors due to minimum errors of the corresponding extraction results are large, and the obtained three-dimensional shape has low reliability. On the other hand, the obtained three-dimensional shape is not displayed considering its low reliability.

That is, the present invention is also addressed to improvement of reliability in three-dimensional information processing.

On the other hand, the present invention is addressed to storage of image information in the dynamic image sensing environment. Problems associated with storage of image information in the dynamic image sensing environment will be discussed below.

In a certain prior art associated with the dynamic image sensing environment, a single image sensing unit placed on a rail is translated to sense a plurality of images, and shape analysis is made using the correlation among the sensed images.

In addition, Japanese Patent Publication No. 7-9673 is known as the technique of analyzing the shape of a stereoscopic object using the correlation among two pairs of parallax images sensed at the same time using a compound-eye image sensing device which is made up of a plurality of image sensing units. In this prior art, the image sensing device is fixed to a robot arm, and is moved as instructed to sense images.

A conventional image sensing apparatus which allows the photographer to freely carry the image sensing apparatus main body and can analyze the shape of an arbitrary object will be described below.

FIG. 1 is a block diagram showing the arrangement of a conventional portable automatic image sensing apparatus and the principle of its use state.

In FIG. 1, reference numeral 1101 denotes an object to be sensed (a cup in this embodiment), which is placed on a pad 1102, and a case will be explained below wherein this object 1101 is to be sensed. A plurality of bright point marks 1103a, 1103b, and 1103c are printed on the pad 1102, and their position relationship is known and is pre-stored in an image sensing apparatus 1900 (to be described below).

Reference numeral 1900 denotes a portable image sensing apparatus, which comprises photographing lenses 1110 and 1111, shutters 1112 and 1113 which also serve as iris diaphragms, image sensing elements 1114 and 1115 for performing photoelectric conversion, control circuits 1116 and 1117 for controlling the image sensing elements 1114 and 1115, image signal processing circuits 1118 and 1119 for processing signals obtained from the image sensing elements 1114 and 1115, image signal storage circuits 1120 and 1121 for storing image signals output from the image signal processing circuits 1118 and 1119, a corresponding point extraction circuit 1122, an image sensing parameter detection circuit 1123, a ROM (read-only memory) 1124 that stores the (known) position relationship among the bright points on the pad, a unifying circuit 1125 for unifying three-dimensional information, and buffer circuits 1126 and 1127 for temporarily storing the three-dimensional information unified by the three-dimensional information unifying circuit 1125.

This image sensing apparatus 1900 extracts corresponding points from the obtained two image signals by the corresponding point extraction circuit 1122 to obtain distance images at the individual timings, and at the same time, obtains image sensing parameters (the position relationship between the pad and the image sensing apparatus 1900 obtained based on the bright point coordinate positions, accurate focal length, and the like) using the image sensing parameter detection circuit 1123 and the ROM 1124. The three-dimensional information unifying circuit 1125 calculates three-dimensional shape data and texture image data of the object 1101 on the basis of these distance images, image sensing parameters, and change information that expresses their time-series changes, and stores them in the buffer circuits 1126 and 1127.

In FIG. 1, reference numeral 1140 denotes numerical value data of the three-dimensional shape of the object 1101 output from the image sensing apparatus 1900; and 1141, developed image data of the surface texture of the object 1101. These output data are transferred to a personal computer or the like, which performs texture mapping to display the input data as a stereoscopic CG (computer graphics) image. The display angle, size, and the like of the CG image can be instantaneously changed, and the image can also be deformed and processed. Two CG images which have slightly different view points are generated, and are output to a stereoscopic display, thus allowing the user to observe a stereoscopic image. In this case, since the stereoscopic image can be freely rotated and deformed, the user can experience higher reality.

In the image sensing apparatus 1900, the corresponding point extraction circuit 1122 and the three-dimensional information unifying circuit 1125 require the most complicated, time-consuming processing and, hence, require a very large circuit scale and consumption power. The image sensing apparatus 1900 has a sequential processing mode in which such complicated processing is sequentially executed while sensing images, and a simultaneous processing mode in which the required sensed images are stored in the image signal storage circuits 1120 and 1121, and thereafter, the processing is executed simultaneously. On the other hand, the image sensing apparatus 1900 allows the photographer to freely carry the image sensing apparatus 1900 without requiring any large-scale positioning device unlike in the above-mentioned prior art, and can easily analyze the shape of the object 1101 without requiring any special preparation processes.

However, the prior art shown in FIG. 1 suffers the following problems.

More specifically, in general, accurate positioning cannot be attained at a constant speed even by the operation of the photographer unlike in the above-mentioned conventional positioning device. For example, when images are stored in the image storage circuit at given time intervals and are subjected to image processing, redundant information increases in a portion sensed by moving the apparatus at an excessively low speed, and a very large image memory capacity is required, resulting in a long shape analysis time. Furthermore, the analyzed three-dimensional shape data becomes excessively fine, and the subsequent CG generation requires an extra processing time and storage capacity. Conversely, when the photographer moves the image sensing apparatus at high speed, information required for analyzing the three-dimensional shape becomes short, and the analysis precision is impaired. In the worst case, if an image of a specific side surface of the object cannot be acquired, the shape information of that portion is lost.

SUMMARY OF THE INVENTION

The present invention has been made in consideration of the above situation, and has as its object to provide a three-dimensional information processing apparatus and method, which can flexibly cope with dynamic image sensing, and can process the obtained three-dimensional information into various forms.

In order to achieve the above object, according to the present invention, there is provided a three-dimensional information processing apparatus for obtaining three-dimensional information from an object having a three-dimensional shape, and performing predetermined information processing, comprising:

image sensing means for sensing images of the object from a plurality of coordinate positions using an image sensing system having one or a plurality of optical systems;

information extraction means for extracting a plurality of depth information from image sensing related information sensed by the image sensing means at the plurality of coordinate positions; and conversion/unification means for converting and unifying the plurality of depth information extracted by the depth information extraction means into depth information expressed by a unified coordinate system.

Also, in order to achieve the above object, according to the present invention, there is provided a three-dimensional information processing method for obtaining three-dimensional information from an object having a three-dimensional shape, and performing predetermined information processing, comprising:

the first step of sensing images of the object from a plurality of coordinate positions using an image sensing system having one or a plurality of optical systems;

the second step of extracting a plurality of depth information from image sensing related information sensed at the plurality of coordinate positions in the first step; and the third step of converting and unifying the plurality of depth information extracted by the depth information extraction means into depth information expressed by a unified coordinate system.

According to the apparatus and method with the above arrangement, upon unifying depth information, since a plurality of depth information are converted into depth information expressed by a unified coordinate system on the basis of, e.g., the luminance information of the object and displacement information of distance information, the present invention can flexibly cope with dynamic image sensing in which image sensing is done while moving the apparatus around a certain object, and can easily process the obtained information into various image forms.

According to one preferred aspect of the present invention, a displacement between coordinate systems of the plurality of depth information is detected on the basis of the image information of the object.

According to one preferred aspect of the present invention, the unified coordinate system has five different projection planes.

According to one preferred aspect of the present invention, the image information includes luminance information of the object, and the displacement between the coordinate systems is detected on the basis of the luminance information.

In order to achieve the above object, according to the present invention, there is provided a three-dimensional information processing apparatus for obtaining three-dimensional information from an object having a three-dimensional shape, and performing predetermined information processing, comprising:

image sensing means for sensing images of the object using an image sensing system having one or a plurality of optical systems;
   three-dimensional shape extraction means for extracting three-dimensional shape information of the object from image sensing related information sensed by the image sensing means; and
   reliability determination means for determining reliability of the three-dimensional shape information extracted by the three-dimensional shape extraction means.

It is another object of the present invention to provide a three-dimensional information processing apparatus and method, which can notify the discrimination result of reliability.

It is still another object of the present invention to provide a three-dimensional information processing apparatus and method, which can process three-dimensional shape information in accordance with the discrimination result of reliability, and can display the processed three-dimensional shape information.

According to one preferred aspect of the present invention, the reliability of the three-dimensional shape information is determined on the basis of an angle of the object with respect to an image sensing plane.

According to one preferred aspect of the present invention, the reliability of the three-dimensional shape information is determined on the basis of a distance between the image sensing means and the object.

According to one preferred aspect of the present invention, the reliability of the three-dimensional shape information is determined on the basis of an angle a pad that places the object thereon makes with an image sensing plane of the image sensing means.

According to one preferred aspect of the present invention, the reliability of the three-dimensional shape information is determined on the basis of an area ratio of a pad that places the object thereon to an image sensing region.

According to one preferred aspect of the present invention, the reliability of the three-dimensional shape information is determined on the basis of a position of a pad that places the object thereon.

According to one preferred aspect of the present invention, the reliability of the three-dimensional shape information is determined on the basis of reflected light information reflected by the object.

According to one preferred aspect of the present invention, the reliability of the three-dimensional shape information is determined on the basis of a degree of correspondence of pixels between a plurality of image sensing related data sensed by the image sensing means.

It is still another object of the present invention to provide an image sensing method and apparatus, which can minimize the storage capacity of storage means that stores images, can shorten the time required for processing images, and can avoid any errors upon executing processing or display after image sensing.

In order to achieve the above object, according to the present invention, there is provided an image sensing method comprising:

the image sensing step of sensing images of an object;
   the storage step of storing image information of the object;
   the image sensing condition detection step of detecting a relative relationship between the object and an image sensing apparatus main body; and
   the control step of controlling a storage operation of the image information,
   wherein the control step includes the step of controlling the storage operation in the storage step in accordance with a detection result of the image sensing condition detection step.

Also, in order to achieve the above object, according to the present invention, there is provided an image sensing apparatus comprising:

image sensing means for sensing images of an object;
   storage means for storing image information of the object;
   image sensing condition detection means for detecting a relative relationship between the object and an image sensing apparatus main body; and
   control means for controlling the storage means,
   wherein the control means controls the storage means in accordance with an output from the image sensing condition detection means.

According to the method or apparatus with the above arrangement, since the required minimum capacity of images used in image display and three-dimensional shape analysis is always stored, the storage capacity of the storage means can be reduced, and the operation time of the three-dimensional shape analysis processing means can be shortened, thereby realizing a size reduction and a cost reduction of the overall apparatus.

In order to achieve the above object, according to the present invention, there is provided an image sensing method comprising:

the image sensing step of sensing images of an object;
   the analysis step of analyzing image information obtained in the image sensing step;
   the image sensing condition detection step of detecting a relative relationship between the object and an image sensing apparatus main body; and
   the control step of controlling an image analysis operation in the analysis step,
   wherein the control step includes the step of controlling the image analysis operation in accordance with a detection result of the image sensing condition detection step.

Also, in order to achieve the above object, according to the present invention, there is provided an image sensing apparatus comprising:

image sensing means for sensing images of an object;
   image analysis means for analyzing image information sensed by the image sensing means;

image sensing condition detection means for detecting a relative relationship between the object and an image sensing apparatus main body; and control means for controlling the image analysis means, wherein the control means controls the image analysis means in accordance with an output from the image sensing condition detection means.

According to the image sensing method and apparatus with the above arrangement, since required minimum images alone are subjected to three-dimensional shape analysis processing, the operation time of the three-dimensional analysis can be shortened, and loss of required images can be avoided, thus realizing a size reduction and a cost reduction of the overall apparatus.

According to one preferred aspect of the present invention, control is made to store information associated with the relative relationship between the object and the image sensing apparatus main body together with sensed images sensed in the image sensing step in the storage step. The stored information can be easily compared with desired observation direction information input by the observer upon reproduction of an image, and an appropriate image can be instantaneously displayed.

According to one preferred aspect of the present invention, the image sensing condition is detected using a sensor for detecting an angle and translation movement of the image sensing apparatus main body. Sampling positions can be assigned on the space at nearly equal intervals by a simple apparatus arrangement.

According to one preferred aspect of the present invention, the image sensing condition detection includes the step of analyzing an object image and images around the object sensed by the image sensing apparatus main body, and detecting an angle and translation movement of the image sensing apparatus main body on the basis of changes in state of sensed images sensed in the image sensing step. The sampling interval of images can be appropriately changed in correspondence with the complexity of the object structure.

According to one preferred aspect of the present invention, the image sensing condition detection includes the step of analyzing an object image and images around the object sensed by the image sensing apparatus main body, and detecting changes in relative position relationship between the object and the image sensing apparatus main body on the basis of an error signal generated upon analyzing the images. Since the shape information of the object region that could not be analyzed at a certain time can be compensated for using information obtained by analyzing an image at a different time, accurate three-dimensional shape data can always be output.

According to one preferred aspect of the present invention, the image sensing condition detection includes the step of analyzing an object image sensed by the image sensing apparatus main body, and detecting changes in occlusion state of the object. Even for an object with a complicated shape, regions that cannot be analyzed are few, and accurate information can be output as a whole.

According to one preferred aspect of the present invention, the image sensing condition detection includes the step of analyzing an object image sensed by the image sensing apparatus main body, and detecting an overlapping region area between time-serial object images. In particular, when high-magnification image sensing is done, joint analysis between images can be performed from images with predetermined precision, and loss of required images can be avoided.

According to one preferred aspect of the present invention, the image sensing condition detection includes the step of analyzing an object image sensed by the image sensing apparatus main body, and detecting changes in distance image of the object. In the object region corresponding to a complicated three-dimensional shape, the number of times of sampling can be increased, and high-precision three-dimensional shape data can be output.

According to one preferred aspect of the present invention, the image sensing condition detection includes the step of analyzing an object image sensed by the image sensing apparatus main body, and detecting changes in distance image of the object. In the object region corresponding to a complicated three-dimensional shape, the number of times of sampling can be increased, and high-precision three-dimensional shape data can be output.

According to one preferred aspect of the present invention, the image sensing condition detection includes the step of stopping the image sensing step and the analysis step during a period in which neither storage processing nor analysis processing are performed. Since the image sensing means and the image analysis means that consume relatively large power cease to operate during the period that requires neither image storage nor processing, consumption power can be greatly reduced.

According to one preferred aspect of the present invention, the image analysis step includes the step of performing an analysis calculation for acquiring a three-dimensional shape and a surface image of the object using a plurality of images. Accordingly, since an object image is generated using texture mapping or the like in computer graphics, the observer can freely select the observation direction and distance, and the three-dimensional shape and surface state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a schematic view showing the intermediate point interpolation method;

FIG. 19 is an explanatory view of reliability discrimination;

FIG. 20 is an explanatory view of reliability discrimination;

FIG. 24 is an explanatory view of reliability discrimination according to the third modification;

FIGS. 30A to 30C show examples of sensed images in the third embodiment;

DETAILED DESCRIPTION OF THE INVENTION

The preferred embodiments of the present invention will be described in detail hereinafter with reference to the accompanying drawings.

<First Embodiment>

The first embodiment of the present invention will be described below.

Figure 2:
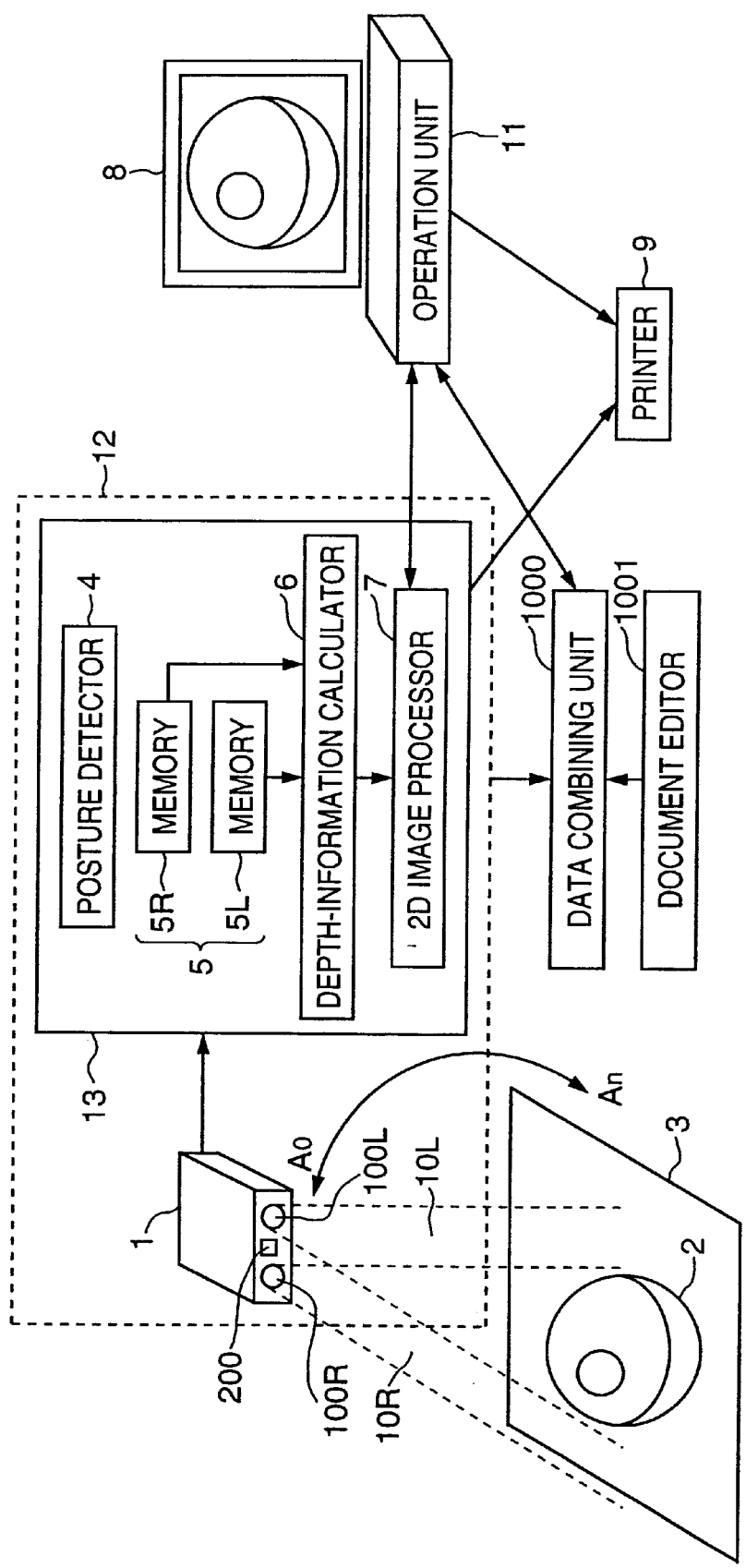
FIG. 2 is a schematic block diagram showing the arrangement of a three-dimensional information processing apparatus according to the first embodiment of the present invention.

FIG. 2 is a schematic block diagram showing the arrangement of a three-dimensional information processing apparatus according to the first embodiment of the present invention.

Arrangement

A three-dimensional information processing system according to the first embodiment comprises an image sensing head device 1, a three-dimensional shape extractor 12 for extracting the three-dimensional shape from an image sensed by the head device 1, a text editor 1001 for creating text data, a data combining unit (program) 1000 for combining image data extracted by the extractor 12 and the data generated by an operation unit 11, a monitor 8 for displaying two-dimensional image data of an object 2 and text data, a printer 9 for printing the two-dimensional data of the object 2 and text data on a paper sheet or the like, and the operation unit 11 for moving the view point of the object 2, changing the display format of the object 2, and attaining combining and editing of data using the data combining unit 1000.

The image sensing head device 1 senses images of the object 2 having a three-dimensional shape, which is present in front of a background plane 3. The three-dimensional shape extractor 12 comprises an image sensing processor 13 for executing various kinds of image processing for images sensed by the image sensing head device 1.

In the first embodiment, the user can select one of a plurality of display formats of the object 2. More specifically, the display formats include, e.g., a natural image, a line image that expresses the edges of the object 2 by lines, a polygon image that expresses the surface of the object 2 as contiguous planes each having a predetermined size, and the like.

The image sensing head device 1 comprises an image sensing lens 100R located on the right side when viewed from the apparatus, an image sensing lens 100L located on the left side when viewed from the apparatus, and an illumination unit 200 that outputs illumination light in correspondence with an image sensing environment. In FIG. 2, 10L represents the image sensing range of the left image sensing lens 100L, and 10R the image sensing range of the right image sensing lens 100R. The image sensing head device 1 senses images of the object 2 while moving to arbitrary positions within the range from an image sensing start position $A_0$ to an image sensing end position $A_n$. Note that the position information of the image sensing head unit 1 at each image sensing position between $A_0$ and $A_n$ is output to a posture detector 4 (to be described later).

The image sensing processor 13 comprises the posture detector 4, an image memory 5, a 3D image processor 6, and a 2D image processor 7.

The posture detector 4 of the image sensing processor 13 has a position detector comprising a unit for calculating the position information of the image sensing head device 1 by image processing on the basis of information obtained from the background plane 3, and a unit for calculating the position information of the image sensing head device 1 by a sensor such as a gyro or the like. With this detector, the position of the image sensing head device 1 with respect to the background plane 3 can be determined.

The image memory 5 stores image data obtained by the image sensing head device 1, and the position information of the image sensing head device 1 obtained by the posture detector 4, and comprises an image memory 5R for right images, and an image memory 5L for left images.

The 3D image processor 6 calculates the three-dimensional shape (depth information, i.e., distance information) of the object 2 on the basis of the image data stored in the image memory 5 and the corresponding position information of the image sensing head device 1.

The 2D image processor 7 calculates two-dimensional image data of the object 2 viewed from an arbitrary view point in the image format designated by the user on the basis of the stereoscopic image data of the object 2 obtained by the 3D image processor 6.

With the three-dimensional information processing apparatus having the above-mentioned arrangement, when the user directs the image sensing head device 1 toward the object 2, and operates a release button (not shown), images of the object 2 are sensed, and the first image data are stored in the image memory 5.

Subsequently, when the user moves the image sensing head device 1 from an arbitrary position $A_0$ to a position $A_n$ to have the object 2 as the center, the posture detector 4 detects that the position and direction have changed from the initial position $A_0$ of the image sensing head unit 1 by a predetermined amount during movement from the position $A_0$ to the position $A_n$. After such detection is done by the posture detector 4, second image sensing is made at a position $A_1$, and thereafter, image sensing is repeated n times in turn.

At this time, the image data and the displacement amounts from the initial image sensing position and direction of the image sensing head device 1 obtained by the posture detector 4 are stored in the image memory 5. When the posture detector 4 detects that at least one of the moving amount of the image sensing head device 1 and the direction change amount has largely exceeded a predetermined value, an alarm unit (to be described later) produces an alarm.

Thereafter, this operation is repeated several times. After the image data sufficient for calculating the depth information of the object 2 are obtained, an image sensing end information unit (not shown) informs the user of the end of image sensing, thus ending the image sensing processing.

Upon completion of the image sensing processing, the 3D image processor 6 calculates stereoscopic image data of the object 2 on the basis of the image data of the object 2 and the position information of the image sensing head device 1 corresponding to the image data, which are stored in the image memory 5. The 2D image processor 7 calculates two-dimensional image data viewed from the initial image sensing position (the position $A_0$) of the object 2, and outputs it to the monitor 8. The image format of the image to be output to the monitor 8 can be selected by the operation unit 11.

The user can display an object image viewed from an arbitrary view point on the monitor 8 by operating the operation unit 11. For this purpose, the 2D image processor 7 generates the object image viewed from the designated view point by performing predetermined calculations of the stereoscopic image data in correspondence with the user's operation on the operation unit 11. Also, the user can change the image format of the object 2 displayed on the monitor 8 to other formats (natural image, polygon image, and the like) by operating the operation unit 11.

The user can output the sensed image of the object 2 to the printer 9 after he or she changes the view point and the image format in correspondence with his or her purpose. Furthermore, the user can combine and edit text data created in advance and the object image data calculated by the 2D image processor 7 using the data combining unit 1000 while displaying them on the monitor 8. At that time, the user can also change the image format and view point of the object 2 by operating the operation unit 11.

The detailed arrangement of the three-dimensional shape extractor 12 will be described below.

Figure 3A:
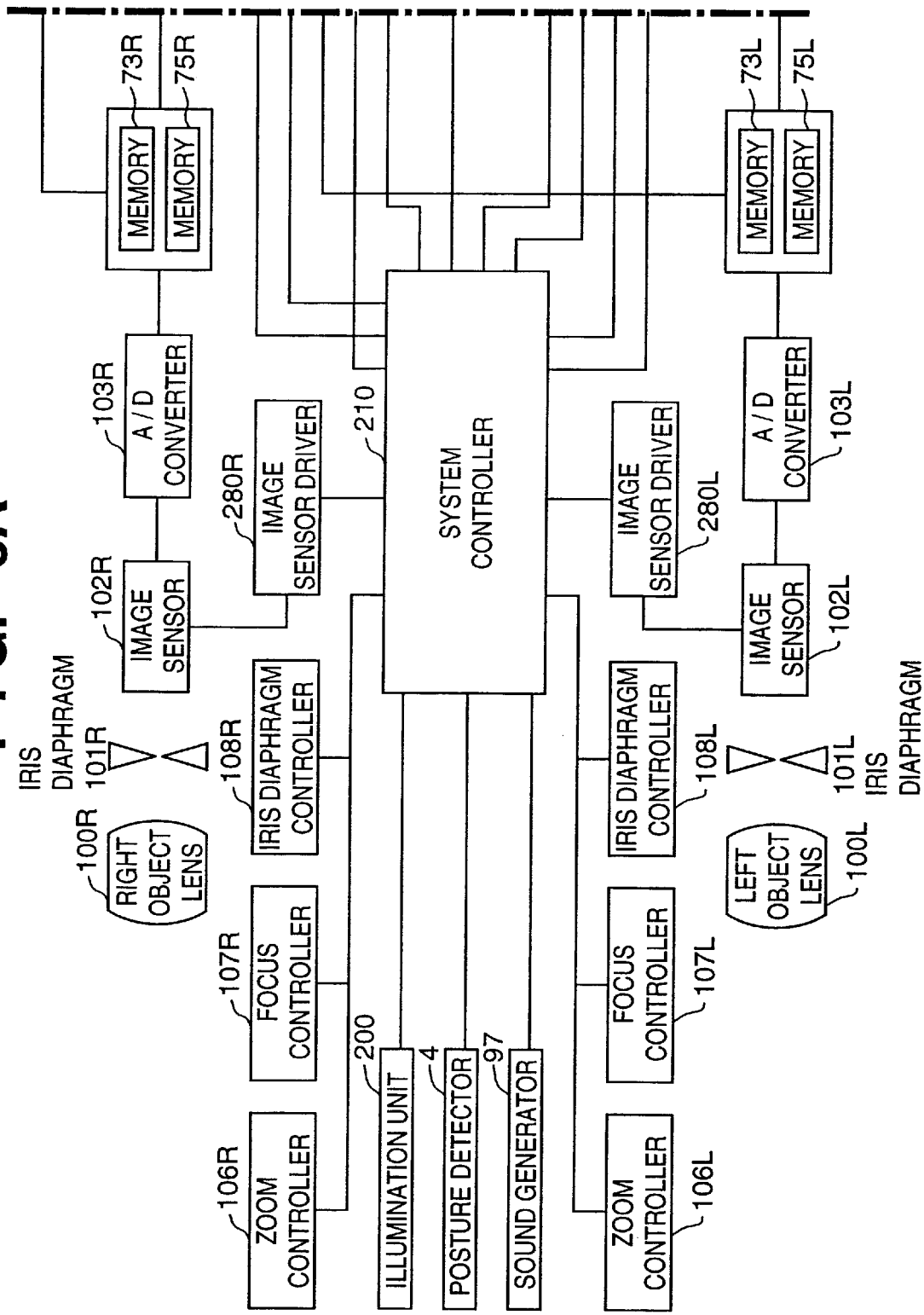
FIGS. 3A and 3B are block diagrams showing the arrangement of a three-dimensional shape extractor 12 in detail.
Figure 3B:
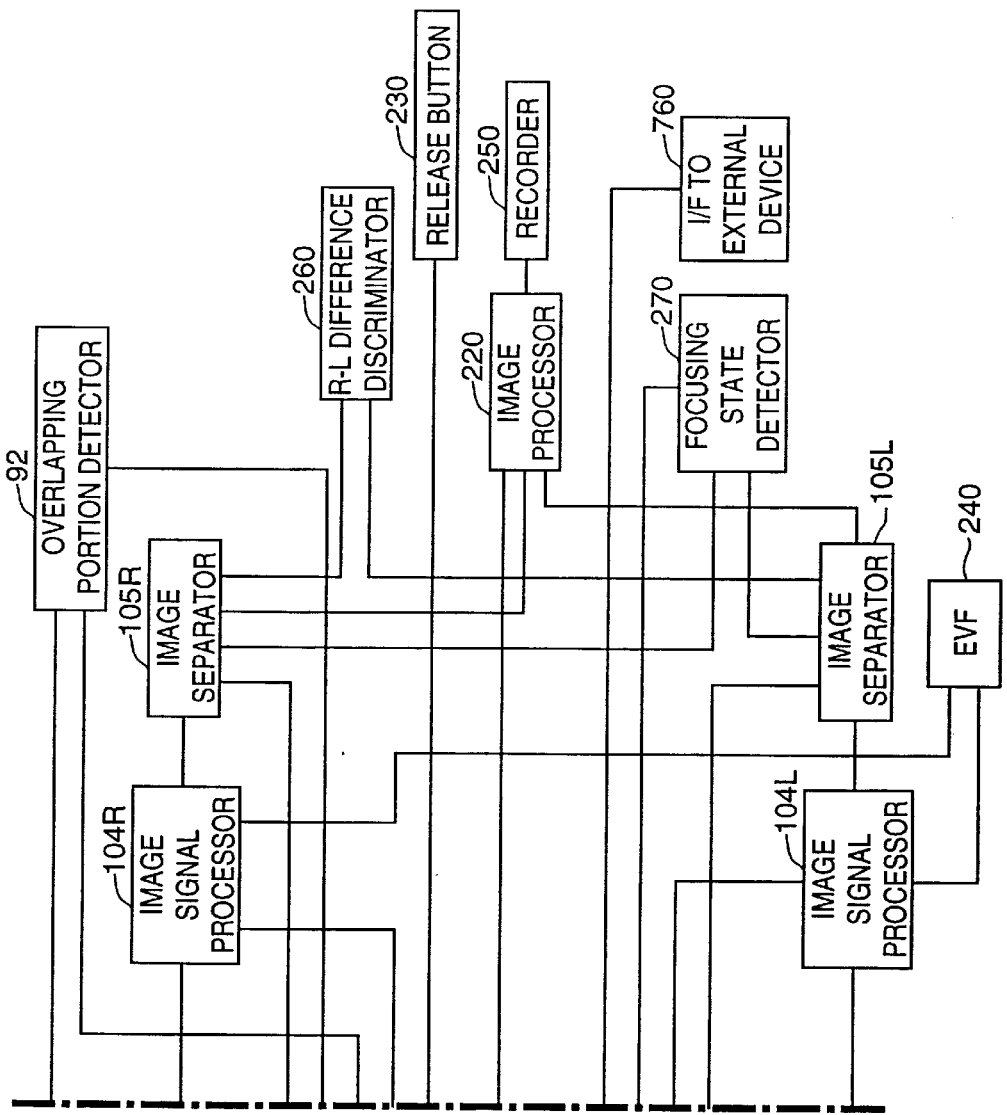

FIG. 3 shows, in detail, the arrangement of the three-dimensional shape extractor 12, i.e., the arrangement of the image sensing head device 1 and the image sensing processor 13.

As shown in FIG. 3, the three-dimensional shape extractor 12 comprises the above-mentioned posture detector 4, image memories 73R and 73L for storing images which are being sensed currently, image memories 75R and 75L for storing images sensed at the immediately preceding image sensing timing, an overlapping portion detector 92 for detecting the overlapping portion of the sensed images, a sound generator 97 for informing the setting state of various image sensing parameters such as an exposure condition and the like by means of a sound, the image sensing lenses 100R and 100L each consisting of a zoom lens, iris diaphragms 101R and 101L for adjusting the amounts of light coming from the image sensing lenses 100R and 100L, image sensors 102R and 102L made up of CCDs, and the like, A/D converters 103R and 103L for analog-to-digital converting signals from the image sensors 102R and 102L, image signal processors 104R and 104L for converting the signals from the image sensors 102R and 102L into image signals, image separators 105R and 105L for separating an object, from which three-dimensional information (depth information) is to be extracted, from the background plane 3, zoom controllers 106R and 106L for adjusting the focal lengths of the image sensing lenses 100R and 100L, focus controllers 107R and 107L for adjusting the focal point positions, iris diaphragm controllers 108R and 108L for adjusting the aperture values, a system controller 210 for controlling the overall three-dimensional shape extractor 12, an image processor 220 including the image memory 5, the 3D image processor 6, and the 2D image processor 7 shown in FIG. 2, a release button 230 which is operated at the beginning of image sensing, an EVF (electronic view finder) 240 for displaying the setting state of various image sensing parameters such as an exposure condition and the like, a recorder 250 which is connected to the image processor 220 to record predetermined image data and the like, an R-L difference discriminator 260 for detecting signals required for R-L difference correction, a focusing state detector 270 for detecting the focusing state, image sensor drivers 280R and 280L for controlling driving of the image sensors 102R and 102L, and an I/F 760 to external devices, which allows connections with the external devices.

Figure 4:
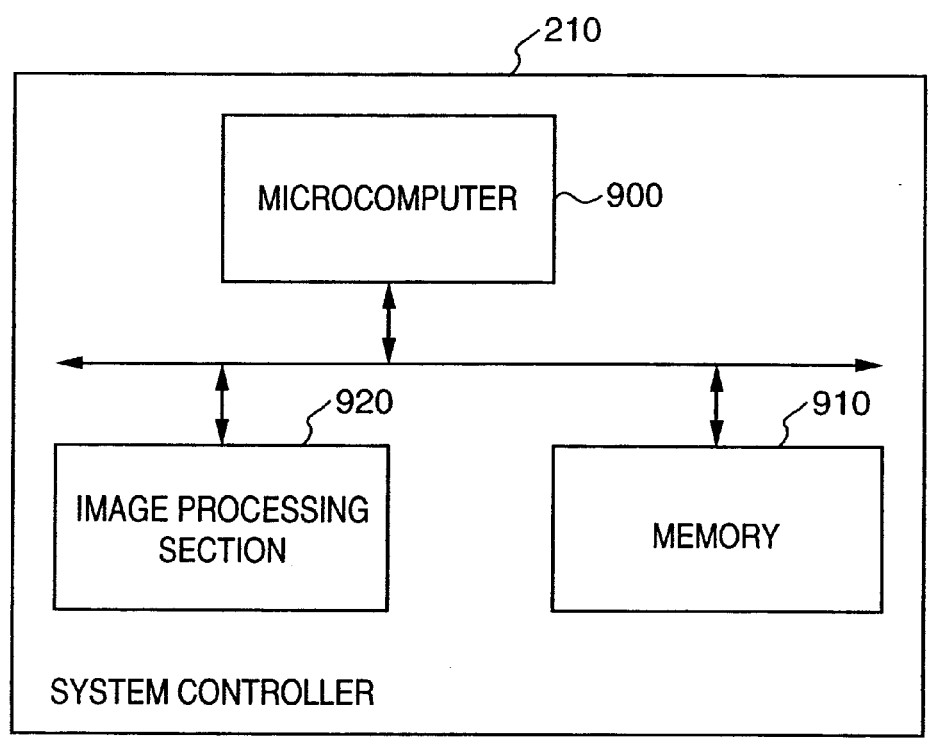
FIG. 4 is a block diagram showing the arrangement of a system controller 210 in detail.

As shown in FIG. 4, the system controller 210 comprises a microcomputer 900 for mainly performing the overall control, a memory 910 which stores a program required for the overall control, sensed image data, and the like, and an image processing section 920 for performing predetermined calculation processing for the image data and the like stored in the memory 910 and the like.

The image processor 220 extracts three-dimensional information of the object 2 from image signals obtained from the image sensing lenses 100R and 100L, and unifies and outputs a plurality of extracted three-dimensional information (depth information) of the object 2 at the individual image sensing positions on the basis of a plurality of posture information at the individual image sensing positions obtained from the posture detector 4.

Figure 5:
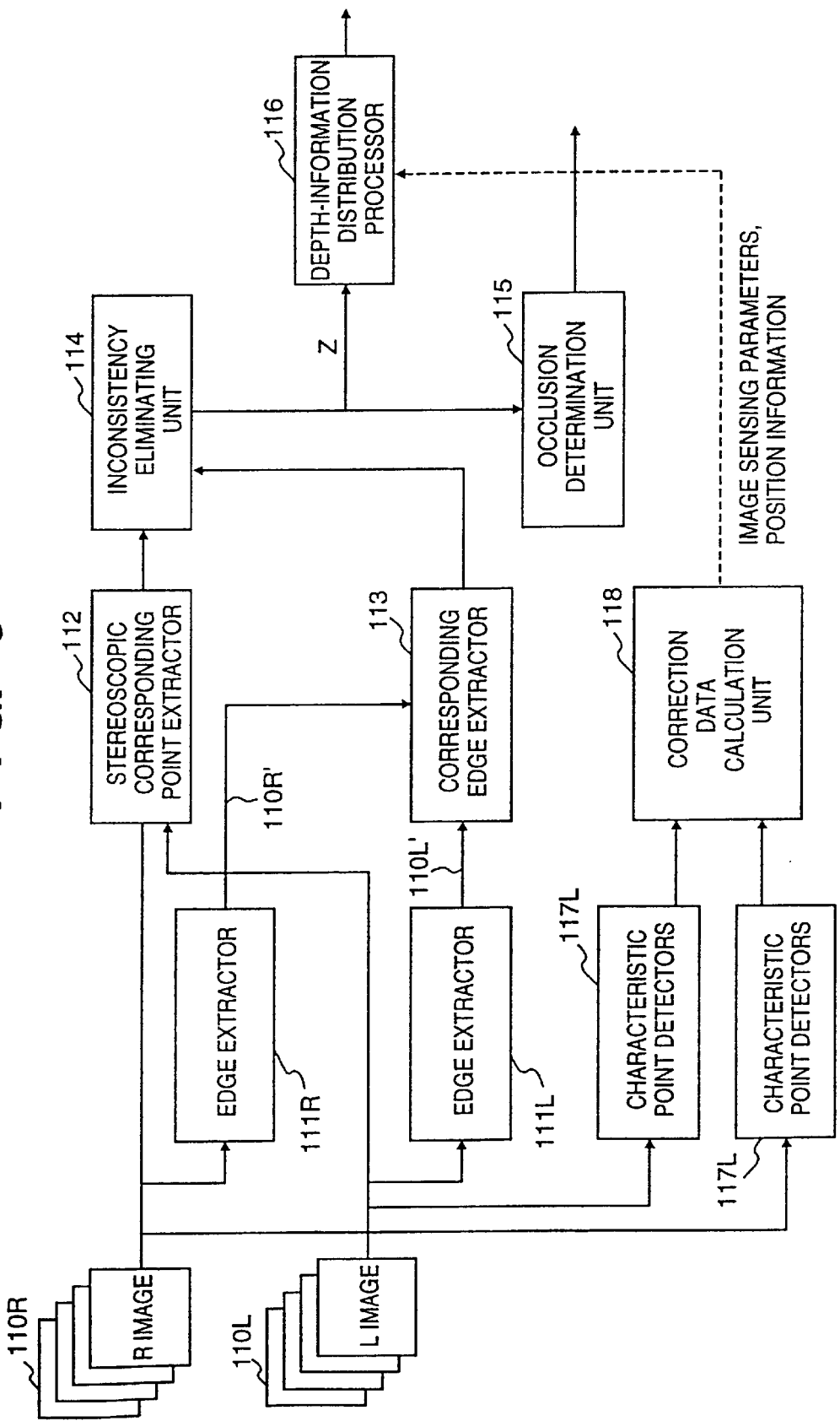
FIG. 5 is a block diagram showing the portion associated with extraction of depth information.

FIG. 5 is a block diagram showing the arrangement of the image processor 220 in detail, and mainly shows the arrangement portion associated with extraction of depth information in the image processor 220.

The image processor 220 extracts depth information from stereoscopic images 110 consisting of right and left images (R and L images) stored in the predetermined image memories.

As shown in FIG. 5, the image processor 220 comprises edge extractors 111 (111R, 111L) for extracting edge images from the stereoscopic images 110, a stereoscopic corresponding point extractor 112 for extracting the correspondence among pixels in the stereoscopic images 110, a corresponding edge extractor 113 for extracting the correspondence among pixels in two edge images extracted by the edge extractors 111, an inconsistency eliminating unit or eliminator 114 for detecting inconsistent portions from the correspondences extracted by the stereoscopic corresponding point extractor 112 and the corresponding edge extractor 113, and eliminating the inconsistent portions, an occlusion determining unit 115 for determining the occlusion region based on the extracted corresponding points and an index indicating the degree of correlation used during corresponding point extraction, e.g., a residual, a depth information distribution processor 116 for calculating the depth information distribution by the principle of trigonometric measurements on the basis of the relationship among the corresponding points, characteristic point extractors 117 (117R, 117L) for identifying characteristic points of a background plane portion, and a correction data calculation unit 118 for acquiring the image sensing parameters, posture, and movement relationship using the characteristic points of the background plane portion.

Figure 6:
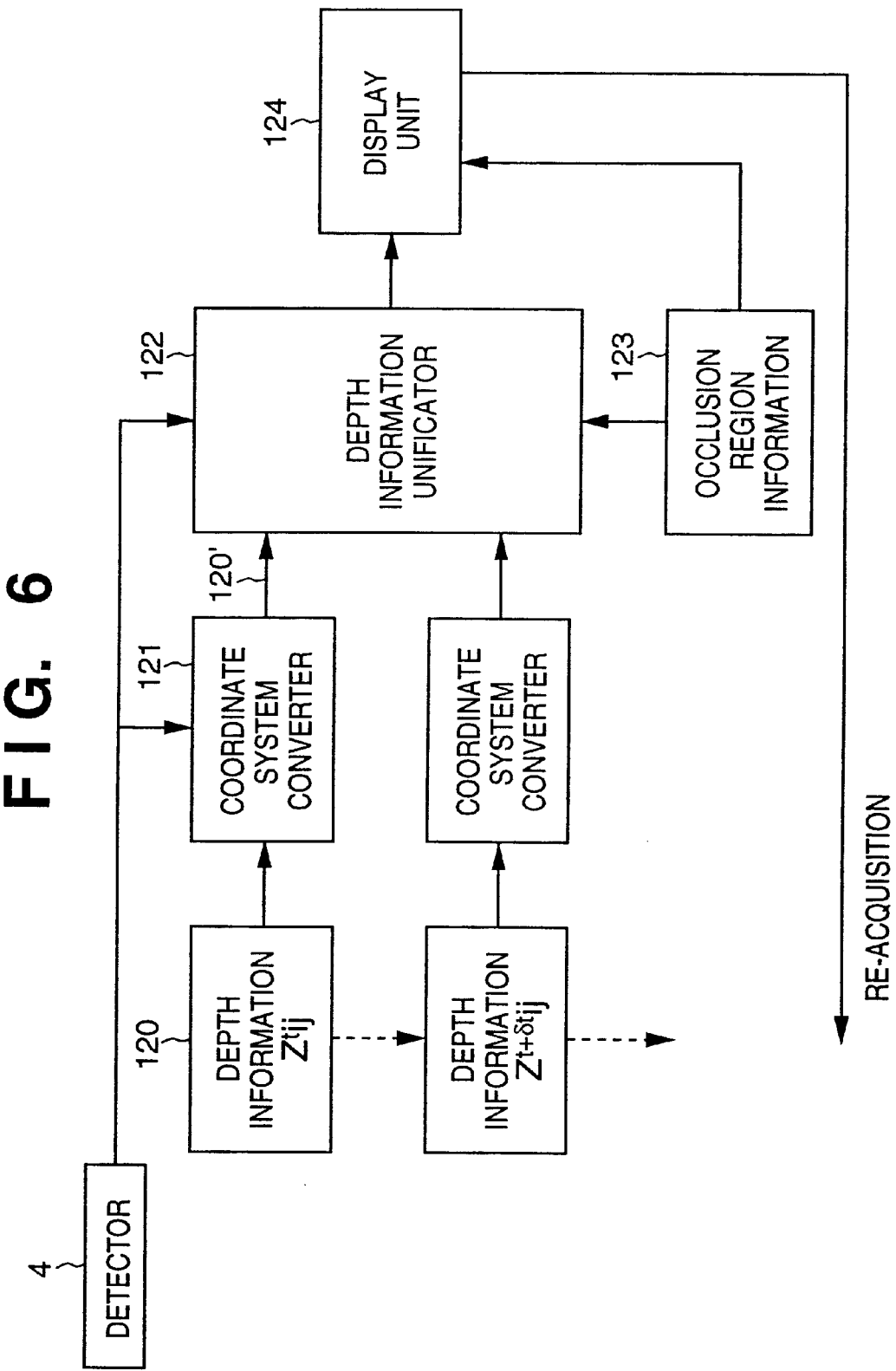
FIG. 6 is a block diagram showing the portion associated with unification of depth information.

FIG. 6 is a block diagram showing the arrangement of the image processor 220 in more detail, and mainly shows the arrangement portion associated with unification of depth information of the object 2 in the image processor 220. Note that "unification" means conversion of images sensed at different positions to image data associated with a single unified coordinate system. More specifically, "unification" is to convert a plurality of depth information of the object obtained from at least two arbitrary positions into depth data viewed from a single coordinate system. Also, "unification" of this embodiment also implies coordinate interpolation processing (to be described later).

In order to attain unification processing of depth information of the object 2, as shown in FIG. 6, the image processor 220 comprises a coordinate system converter 121 for converting two depth information data ($Z^t(i, j)$ and $Z^{t+\delta t}(i, j)$) 120 from a pair of stereoscopic images 110 obtained by the individual units onto a unified coordinate system, a depth information unificator 122 for unifying depth information 120' converted onto the unified coordinate system, and a display unit 124 for displaying the unified depth information.

Also, the image processor 220 comprises a unit for outputting occlusion region information 123 to the unificator 122 and the display unit 124, and a unit for detecting the moving amount and direction of the image sensing head device 1, and the like.

Operation

The operation of the three-dimensional information processing apparatus of the first embodiment with the above arrangement will be described below.

The operation of the three-dimensional shape extractor 12 will be described in detail below with reference to FIG. 3.

In the three-dimensional shape extractor 12, images of the object 2 are input via the image sensing lenses 100R and 100L. The input object images are converted into electrical signals by the image sensors 102R and 102L. Furthermore, the converted signals are converted from analog signals into digital signals by the A/D converters 103R and 103L, and the digital signals are supplied to the image signal processors 104R and 104L.

The image signal processors 104R and 104L convert the digital signals of the object 2 into luminance and chrominance signals in an appropriate format. The image separators 105R and 105L measure depth information in the object to be sensed on the basis of the signals obtained from the image signal processors 104R and 104L, thereby separating the principal object 2 from the background plane 3.

As one separation method, an image of the background plane 3 is sensed in advance, and is stored in a predetermined memory. Thereafter, the principal object 2 is placed on the background plane, and its image is sensed. The sensed image and the stored image of the background plane 3 are subjected to matching and differential processing, thereby separating the background plane region. Note that the separation method is not limited to such specific method, and the background plane region may be separated on the basis of color or texture information.

The separated image data of the principal object 2 are supplied to the image processor 220, which executes three-dimensional shape extraction processing on the basis of various image sensing parameters obtained upon image sensing.

The image sensing parameters upon image sensing include, e.g., a focal length, which can be set by the following method.

Distance information Z is given by the following equation (1):

$$Z = \frac{f \cdot B}{d} \quad (1)$$

where Z: the distance, f: the focal length, B: the base line distance; and d: the parallax.

In order to precisely recognize the three-dimensional shape by image processing, the resolution of the distance Z corresponding to the parallax is important. The resolution of Z is defined by the following equation:

$$\frac{\partial Z}{\partial d} = -\frac{f \cdot B}{d^2} \quad (2)$$

Accordingly, the focal length f is written as follows using the distance resolution determined by the parallax as a parameter:

$$f = -\frac{d^2}{B} \cdot \frac{\partial Z}{\partial d} \quad (3)$$

Hence, the resolution is set at, e.g., the operation unit 11 via the I/F 760, and the focal length f can be set based on this value.

The method of extracting depth information Z from stereoscopic images 110R and 110L by the image processor 220 will be described below with reference to FIG. 5.

Two processing operations are done for the stereoscopic images 110R and 110L read out from the predetermined image memories.

In one processing, the stereoscopic corresponding point extractor 112 extracts the correspondence among pixels in the stereoscopic images 110R and 110L on the basis of their luminance values.

In the other processing, the corresponding edge extractor 113 extracts the correspondence among pixels in two stereoscopic edge images 110R' and 110L' (obtained as edge images by the edge extractors 111).

The inconsistency eliminator 114 detects inconsistent portions in the correspondences on the basis of the outputs from the above-mentioned corresponding point extractors (112 and 113). If the correspondence obtained based on the luminance values does not coincide with that obtained based on the edge images, it is determined that their reliability is low, and it is proper to eliminate such correspondences. Alternatively, the individual correspondences may be weighted, and inconsistent portions may be detected.

The occlusion determining unit 115 determines the occlusion region on the basis of the obtained corresponding points and an index (e.g., a residual R) indicating the degree of correlation between corresponding points used during calculations of the corresponding points. This processing is to add reliability to the results of the corresponding point processing, although the corresponding point processing yields tentative results. As the index indicating the degree of correlation, a correlation coefficient or residual is used. If the residual is very large, or if the correlation coefficient is low, it is determined that the reliability of the correspondence is low. The low-reliability portion is processed as an occlusion region or a region without any correspondence.

Using the correspondence obtained via the above-mentioned processing, the depth information Z of the object 2 is calculated according to equation (1) using the principle of trigonometric measurements.

The template matching method as a typical corresponding point extraction method executed in the above-mentioned stereoscopic corresponding point extractor 112 will be explained below.

Figure 7:
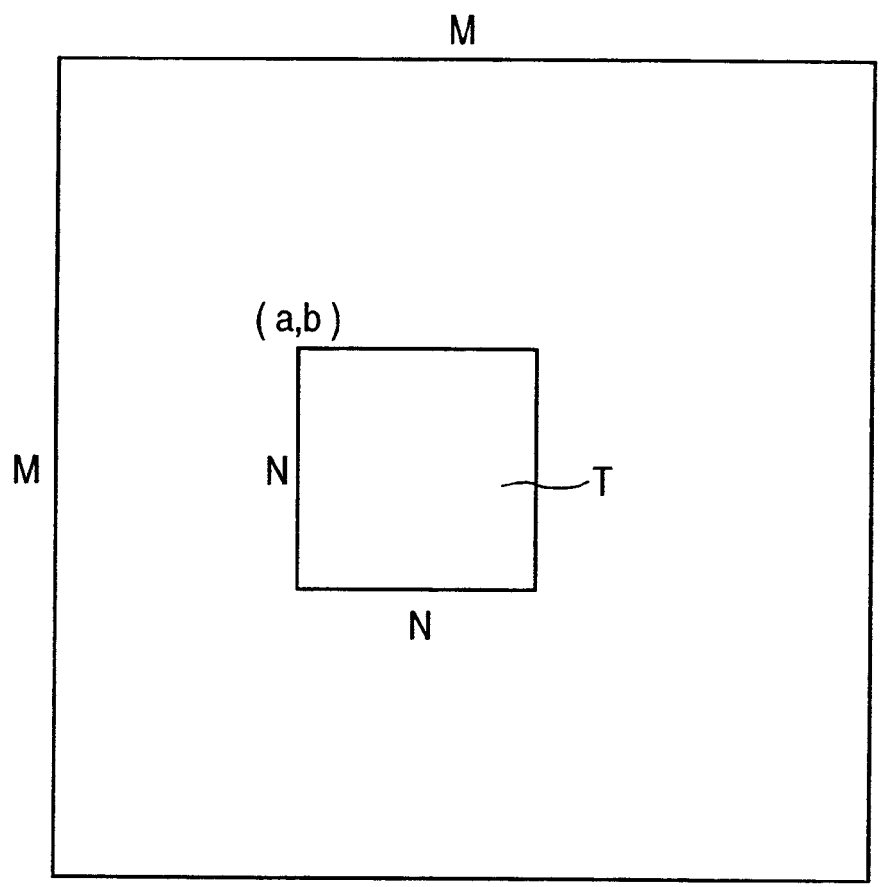
FIG. 7 is an explanatory view of template matching.

In the template matching method, a template image T consisting of N*N pixels is extracted from, e.g., the image 110L obtained by the left image sensing system, as shown in FIG. 7. Using this template T, search of equation (4) below is performed $(M-N+1)^2$ times in a search region having a size of M×M pixels (N<M) in the image 110R obtained by the right image sensing system. That is, as shown in FIG. 7, a position (a, b) is defined as the upper left position of the template $T_L$ to be set, and a residual R(a, b) given by equation (4) below is calculated while placing the template $T_L$ at a certain position (a, b):

$$R(a, b) = \sum_{i=0}^{N-1} \sum_{j=0}^{N-1} |I_{R(a,b)}(i, j) - T_L(i, j)| \quad (4)$$

This operation is repeated by moving the position (a, b) within the image to be searched (in this example, the left image 110L) to obtain a position (a, b) corresponding to the minimum residual R(a, b). The central pixel position of the template image $T_L(i, j)$ when the template image $T_L(i, j)$ is located at the position (a, b) corresponding to the minimum value R(a, b) is determined as a corresponding point. In the above equation, $I_{R(a,b)}I(i, j)$ represents a partial image of the right image 110R when the upper left point of the template is located at the position (a, b).

The stereoscopic corresponding point extractor 112 applies the above template matching method to the stereoscopic images 110 to obtain corresponding points for luminance level.

In corresponding point extraction for edge level, the above-mentioned template matching is done for edge-extracted stereoscopic images 110L' and 110R'.

As pre-processing for corresponding point extraction for edge level, the edge extractors (111) emphasize the edge portions using, e.g., a Robert filter or Sobel filter.

More specifically, when the Robert filter is used, the edge extractors 111R and 111L receive the input images 110R and 110L (f(i, j) represents each input image), and output the output image data (g(i, j) represents each output image) expressed by the following equation:

$$g(i,j)=\mathrm{sqrt}(\{f(i,j)-f(i+1,j+1)\}^2)+\mathrm{sqrt}(\{f(i+1,j)-f(i,j+1)\}^2) \quad (5)$$

or $$g(i,j)=\mathrm{abs}\{f(i,j)-f(i+1,j+1)\}+\mathrm{abs}\{f(i+1,j)-f(i,j+1)\} \quad (6)$$

When the Robert filter is used, an x-filter $f_x$ and y-filter $f_y$ are defined by:

$$f_x = \begin{pmatrix} -1 & 0 & 1 \\ -2 & 0 & 2 \\ -1 & 0 & 1 \end{pmatrix}, \quad (7)$$

$$f_y = \begin{pmatrix} -1 & 2 & -1 \\ 0 & 0 & 0 \\ 1 & 2 & 1 \end{pmatrix} \quad (8)$$

and, the tilt θ of the edge is given by:

$$\theta = \tan^{-1}\left(\frac{f_y}{f_x}\right) \quad (9)$$

The edge extractors perform binarization of such edge-emphasized images to extract edge components. The binarization is performed using an appropriate threshold value.

The time-series unification processing of depth information obtained as described above will be described below with reference to FIG. 6.

FIG. 6 shows the process of generating the depth information Z 120 obtained from the stereoscopic images 110 by the above-mentioned processing time-serially. More specifically, depth information $Z^t(i, j)$ obtained at time t is input to the coordinate system converter 121, and thereafter, depth information $Z^{t+\delta t}(i, j)$ obtained at time t+δt is input.

On the other hand, the posture detector 4 for detecting the moving amount, direction, and the like of the image sensing head device 1 sends that information to the coordinate system converter 121. The coordinate system converter 121 converts the depth information Z onto the unified coordinate system using such position information by the processing method to be described below. By converting the coordinate system of the depth information, the time-serially obtained image information can be easily unified. As the coordinate conversion method in the coordinate system converter 121, for example, affine transformation is used, and identical Euler's angles are set.

Unification of Depth Information

The processing for unifying the depth information converted onto the unified coordinate system in the depth information unificator 122 will be described below with reference to FIGS. 8A to 10A. FIGS. 8A and 8B to FIGS. 10A and 10B are views for explaining the procedure for combining depth information.

Figure 8A:
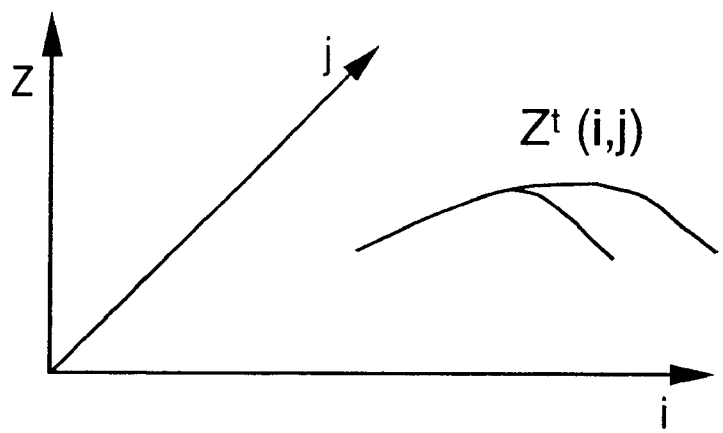
FIGS. 8A and 8B are explanatory views for explaining the procedure of unifying depth information.

FIG. 8A is a graph showing changes in depth information $Z^t(i, j)$ detected at certain time t in a (Zij) space. Note that i and j represent the coordinate axes i and j perpendicular to the depth direction Z of the object 2.

Figure 8B:
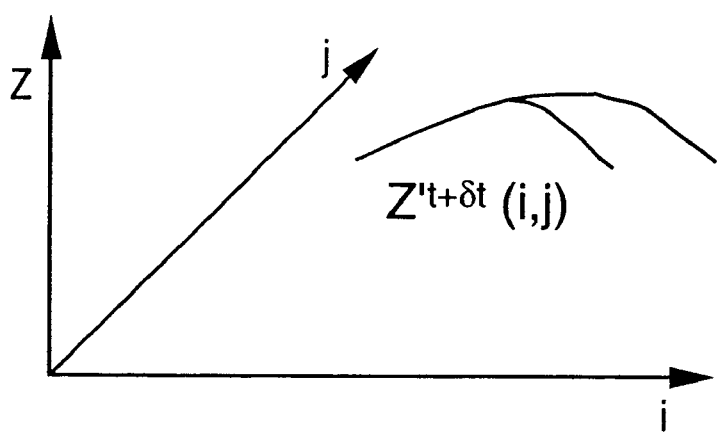

FIG. 8B is a graph showing changes in $Z^{t+\delta t}(i, j)$ obtained by viewing depth information $Z^{t+\delta t}(i, j)$ detected at time t+δt from the unified direction again in the (Zij) space.

Figure 9A:
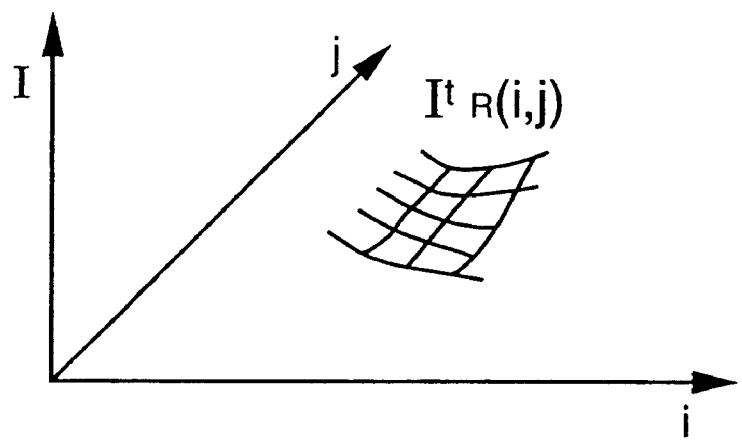
FIGS. 9A and 9B are explanatory views for explaining the procedure of unifying depth information.
Figure 9B:
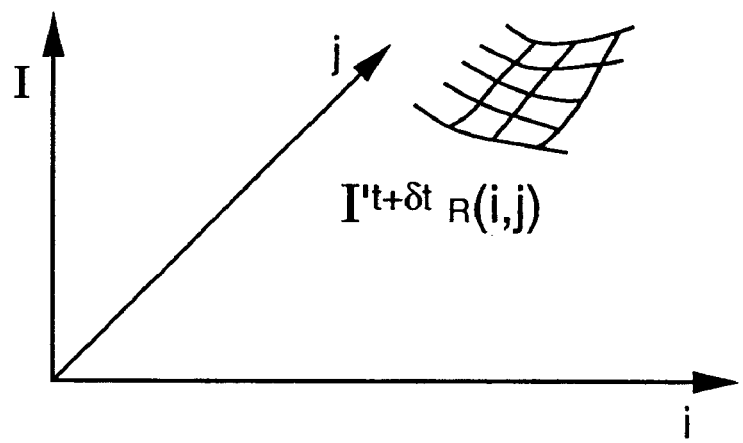

FIG. 9A is a graph showing changes in luminance information $I'_R(i, j)$ in the (Zij) space. FIG. 9B is a graph showing changes in luminance information $I'^{t+\delta t}_R(i, j)$ viewed from the unified direction again.

Figure 10A:
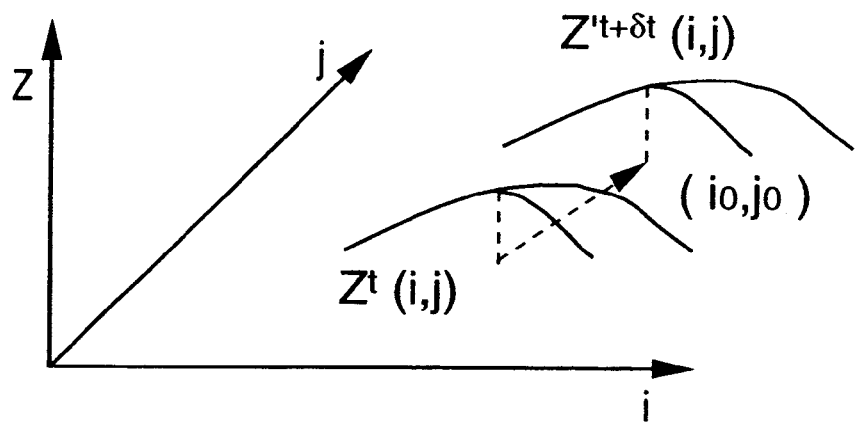
FIGS. 10A and 10B are explanatory views for explaining the procedure of unifying depth information.

FIG. 10A shows shifts in depth information $Z^t(i,j)$ from time t to time t+δt. In FIG. 10A, $(i_0, j_0)$ represents changes in the i and j directions. That is, superposition of the graphs in FIGS. 8A and 8B gives the graph in FIG. 10A.

Figure 10B:
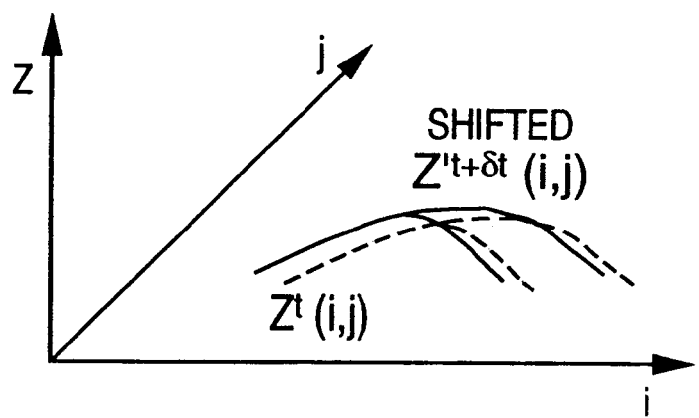

FIG. 10B shows the state wherein $Z^{t+\delta t}(i, j)$ in FIG. 10A is shifted by $(i_0, j_0)$, and is superposed on $Z^t(i, j)$.

As shown in FIG. 10B, upon superposing depth information, the superposing degree Q is calculated using, e.g., the following equation (10):

$$Q = \sum_{i=0}^{N-1}\sum_{j=0}^{N-1} |I_R^t(i, j) - I_R^{t+\delta t}(i, j)| + \sum_{i=0}^{N-1}\sum_{j=0}^{N-1} |Z_R^t(i, j) - Z_R^{t+\delta t}(i, j)| \quad (10)$$

Subsequently, $(i_0, j_0)$ that yields the minimum superposing degree Q is calculated.

Since a bright point Z (having a luminance I) on the object at the depth Z is an identical bright point even at time t and time t+δt, the depth information Z and luminance information I from the identical bright point must assume identical values at time t and time t+δt. Hence, if $Z'^{t+\delta t}(i, j)$ coincides with $Z^t(i, j)$, $(i_0, j_0)$ minimizes the evaluation function Q.

Using the calculated $(i_0, j_0)$, the depth information Z is shifted by $(i_0, j_0)$ and is superposed on another depth information, as shown in FIG. 10B.

Identical Point Removal

Subsequently, identical point removal and intermediate point interpolation are performed. The identical point removal is performed to reduce the information volume in each depth information.

Assume that two corresponding points $(x_0, y_0, z_0)$ and $(x_1, y_1, z_1)$ are obtained from images at time t and time t+δt. Whether or not these two corresponding points are identical points is determined based on the relation below. That is, if the following relation holds for an infinitesimal constant $\epsilon_1$, the two points are determined as identical points, and one of these points is removed:

$$(x_0-x_1)^2+(y_0-y_1)^2+(z_0-z_1)^2<\epsilon_1 \quad (11)$$

In place of relation (11), the following relation may be used:

$$a(x_0-x_1)^2+b(y_0-y_1)^2+c(z_0-z_1)^2<\epsilon_2 \quad (12)$$

where a, b, c, and d are appropriate coefficients. For example, if a=b=1 and c=2, i.e., the weighting coefficient in the z-direction is set to be larger than those in the x- and y-directions, the difference in distance Z in the z-direction between two points can be discriminated more sensitively.

Interpolation with Intermediate Point

As the intermediate point interpolation method, a method of calculating an intermediate point, as shown in, e.g., FIG. 11, may be used.

Note that the Zij three-dimensional space is projected onto a Z-i plane in FIG. 11 for the sake of simplicity.

In FIG. 11, a point A (denoted by ○) on the graph indicates the extracted depth information $Z^t(i, j)$, and a point B (denoted by ●) indicates $Z'^{t+\delta t}(i+i_0, j+j_0)$ obtained by shifting $Z'^{t+\delta t}(i, j)$ by $(i_0, j_0)$. Also, a point C (denoted by □) indicates the interpolated intermediate point, i.e., new depth information $Z_{new}$. As the interpolation method, for example, linear interpolation, spline interpolation, or the like is used.

Unified Coordinate System

The "unified coordinate system" used in the above-mentioned unification processing will be described below with reference to FIGS. 12 and 13.

Figure 12:
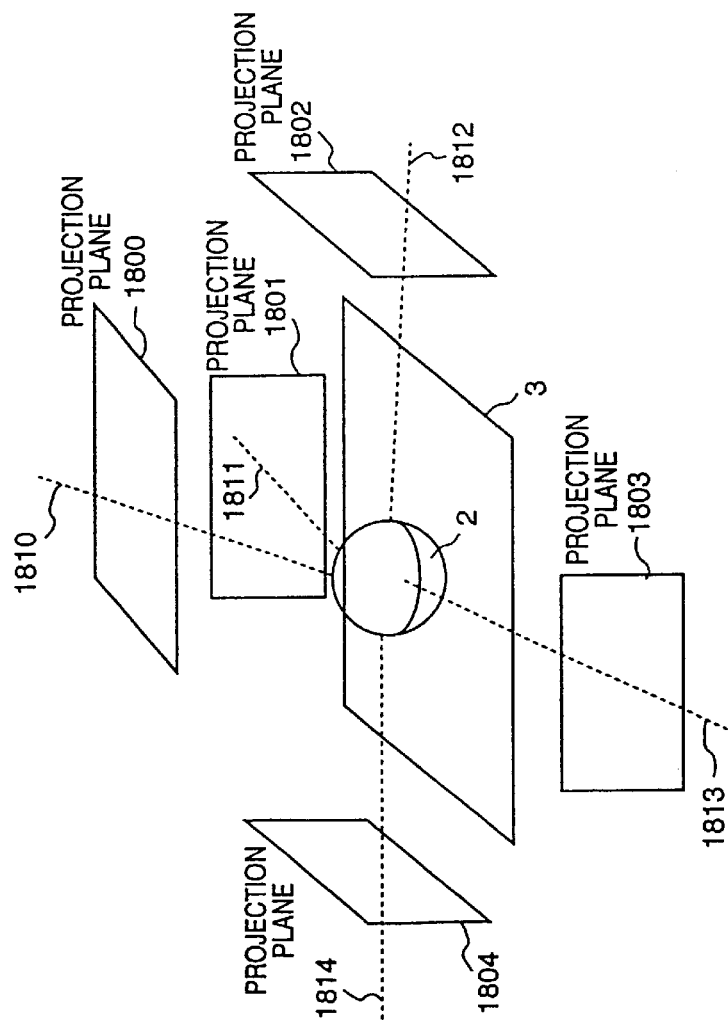
FIG. 12 is a view showing the method of converting depth information into one expressed by a unified coordinate system.

In FIG. 12, reference numeral 2 denotes an object; 3, a background plane formed by a pad; and 1800 to 1804, imaginary projection planes used for registering depth information. Also, reference numerals 1810 to 1814 denote central axes (optical axes) of the imaginary projection plane.

The "unified coordinate system" used in this embodiment means five sets of reference coordinate systems each of which is defined by (x, y, z). That is, as shown in, e.g., FIG. 12, five sets of coordinate systems that form the imaginary projection planes 1800 to 1804 are present.

The depth information $Z^t(i, j)$ obtained by the above processing is projected onto the individual projection planes (five planes). Upon projection, conversions such as rotation, translation, and the like are performed in accordance with the individual reference coordinates. This state is shown in FIG. 13.

Figure 13:
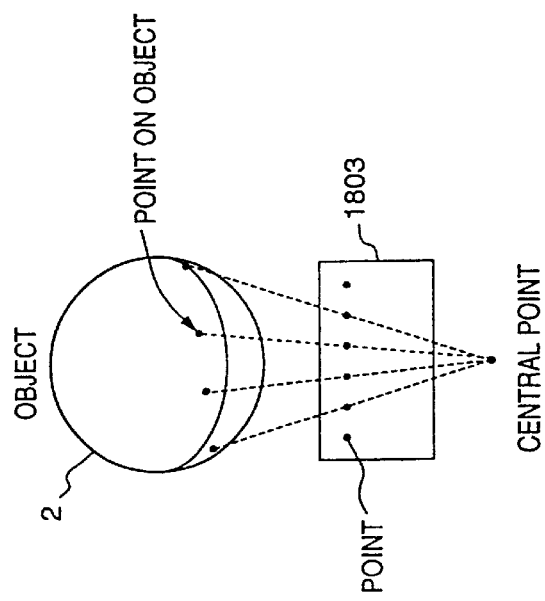
FIG. 13 is a view showing the method of converting depth information into one expressed by the unified coordinate system.

In FIG. 13, the intersections between the projection plane 1803 and straight lines that connect the central point O on the optical axis 1813 and the individual points S on the object are points P converted onto the unified coordinate systems.

Note that FIG. 13 exemplifies the projection plane 1803, and the same applies to other projection planes. Also, the same applies to the next depth information $Z^{t+\delta t}(i, j)$. In this case, each depth information is sequentially overwritten on the previously written one. Accordingly, depth information along five reference axes is obtained for a certain object 2. For example, one point is expressed by five points $(x_0, y_0, z_0)$, $(x_1, Y_1, z_1)$, $(x_2, y_2, z_2)$, $(x_3, y_3, z_3)$, and $(x_4, y_4, z_4)$ on the projection planes 1800 to 1804.

As described above, according to the first embodiment, upon unifying depth information, since a plurality of depth information are converted into a plurality of unified coordinate systems on the basis of displacement information of the luminance information and distance information of the object 2, the present invention can flexibly cope with dynamic image sensing which is done while moving around the object 2, and can process an image to various image formats.

<Modification of First Embodiment> . . . First Modification

The first modification of the first embodiment will be described below. Note that the arrangement of the image sensing device and the image sensing method are the same as those in the first embodiment, and a detailed description thereof will be omitted. Hence, a unificator different from that in the first embodiment will be described below.

In the first modification, a correlation calculation is made using the obtained depth information alone, as shown in the following equation (13):

$$Q = \sum_{i=0}^{N-1}\sum_{j=0}^{N-1} |Z_R^t(i, j) - Z_R^{t+\delta t}(i, j)| \quad (13)$$

More specifically, the first modification does not use any luminance information I given by equation (10) in the first embodiment. Such method is effective for shortening the correlation calculation time albeit slightly.

<Modification of First Embodiment> . . . Second Modification

The second modification will be described below. Note that the arrangement of the image sensing device and the image sensing method are the same as those in the first embodiment, and a detailed description thereof will be omitted. Hence, a unificator different from that in the first embodiment will be described below.

In the second modification, as the method of interpolation, weighting is performed using luminance level given by equation (14) below.

For example, equation (14) is used as a weighting coefficient t:

$$t = \frac{1}{2} \cdot \tanh(I_R^t(i, j) - I_R^{t+\delta t}(i, j)) + \frac{1}{2} \quad (14)$$

Subsequently, in order to obtain new depth information Z by interpolation, weighting is performed as follows as a kind of linear interpolation:

$$Z_{new} = t \cdot Z_1 + (1-t) \cdot Z_2 \quad (15)$$

<Advantages of First Embodiment>

As described above, according to the first embodiment and its modifications, upon unifying depth information, since a plurality of depth information are converted into a plurality of unified coordinate systems on the basis of displacement information of the luminance information and distance information of the object 2, the present invention can flexibly cope with dynamic image sensing which is done while moving around a certain object, and can process an image to various image formats.

<Second Embodiment>

In the first embodiment mentioned above, depth information is converted onto the unified coordinate systems on the basis of the displacements of the luminance information and distance information of the object. A three-dimensional information extraction apparatus of the second embodiment has as its object to improve reliability in three-dimensional information processing. Accordingly, the system of the second embodiment has many common elements to those in the system of the first embodiment. That is, the second embodiment directly uses, as its hardware arrangement, the elements of the first embodiment shown in FIGS. 2 to 4.

Figure 14:
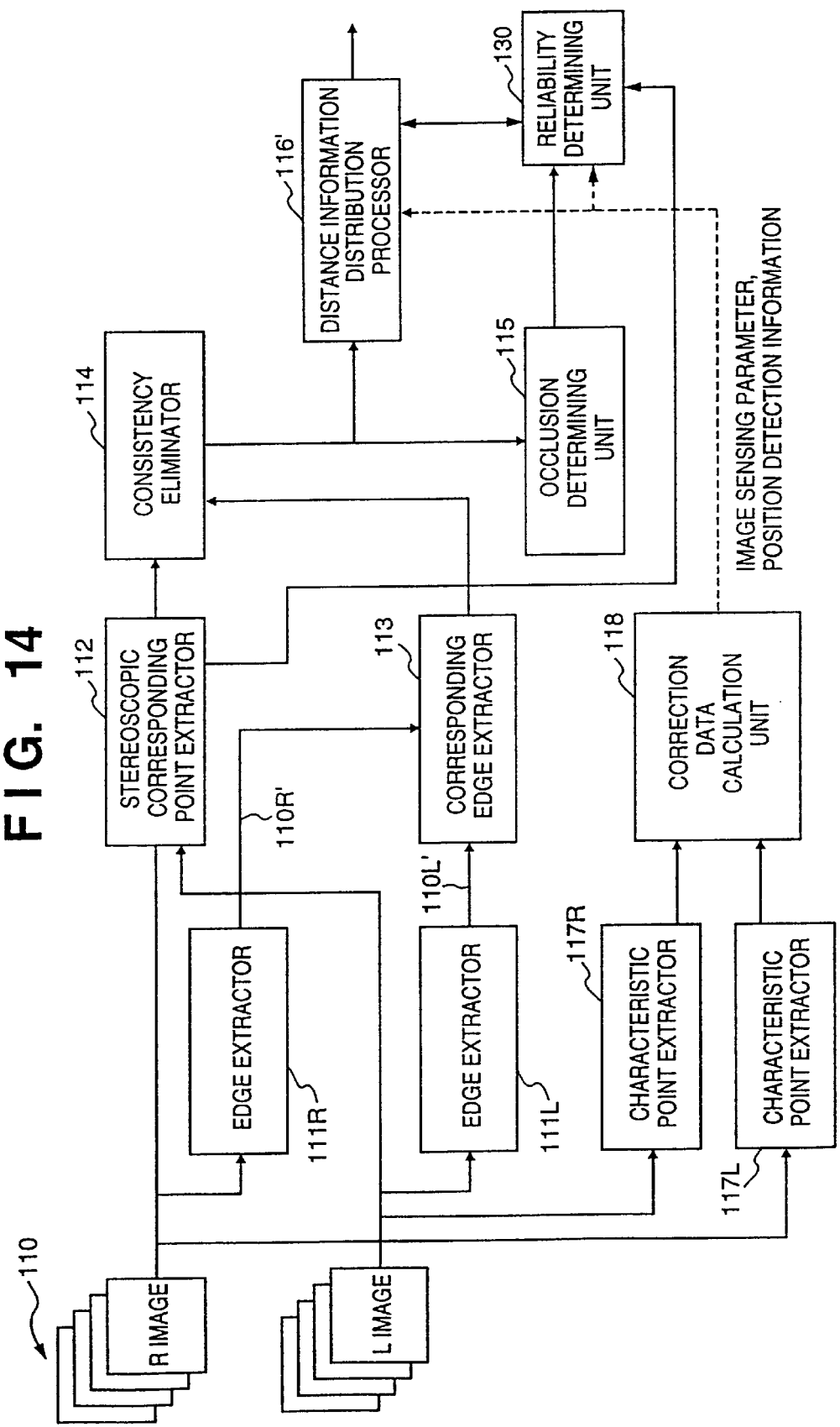
FIG. 14 is a block diagram showing the arrangement associated with extraction of distance information according to the second embodiment of the present invention.

That is, the system of the second embodiment has substantially the same image processor 220 as in the first embodiment, except that the image processor 220 has a distance information distribution processor 116' and a reliability determining unit 130, as shown in FIG. 14. Note that "distance information" is information having the same concept as "depth information". Hence, the arrangement and operation of the distance information distribution processor 116' of the second embodiment will be understood by reference to those associated with the depth information distribution processor 116 of the first embodiment.

Elements different from those in the first embodiment in FIG. 14 will be described below. The distance information distribution processor 116' calculates the distance information distribution using the principle of trigonometric measurements on the basis of the relationship among corresponding points. The reliability determining unit 130 determines reliability.

Note that the reliability determining unit 130 determines the reliability level of the calculated distance information on the basis of the output from the occlusion determining unit 115, the processing result of the distance information distribution processor 116', and the image sensing parameters and position information from the correction data calculation unit 118, and adds reliability information corresponding to the reliability level to the calculated distance information.

Figure 15:
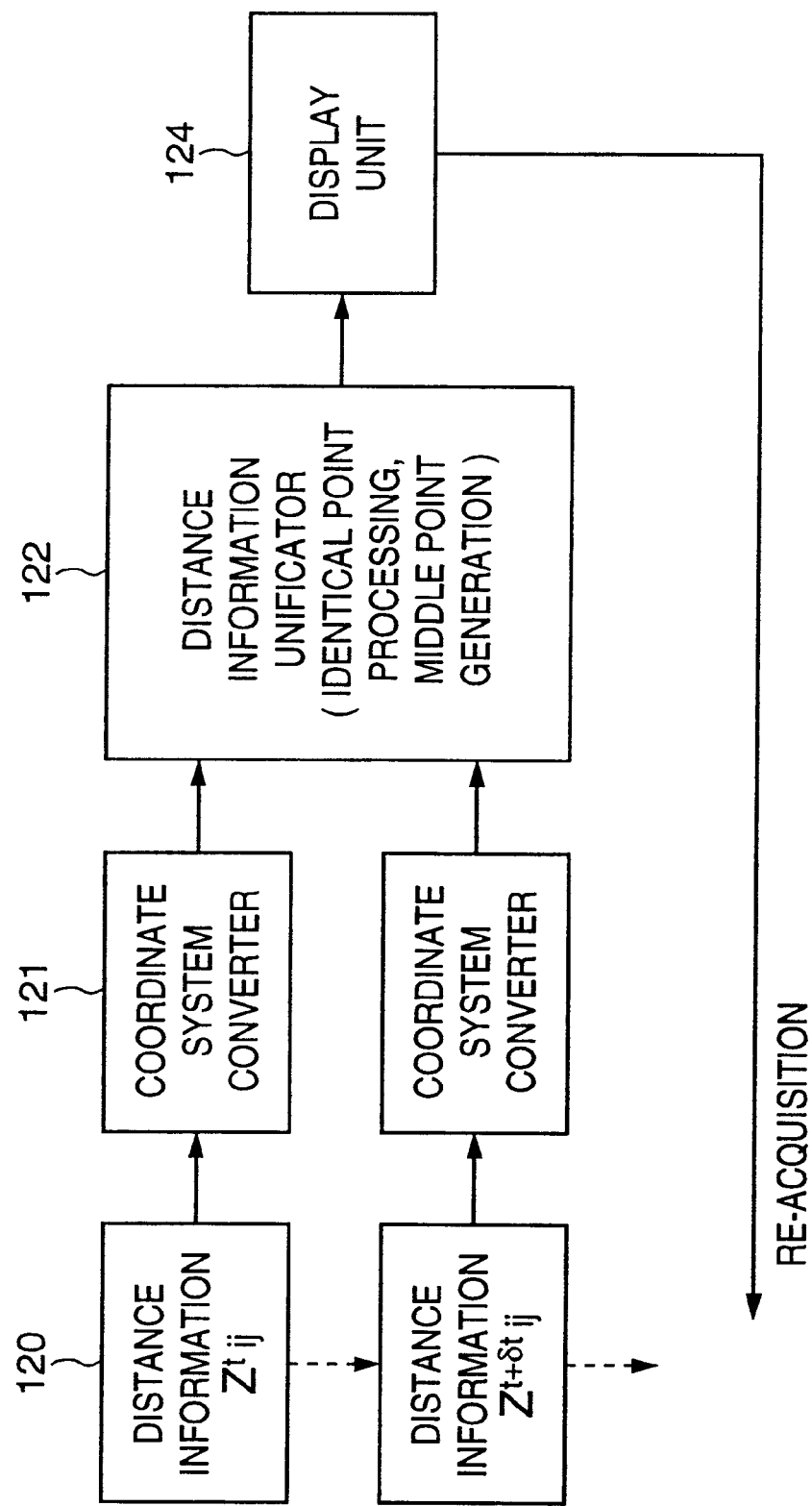
FIG. 15 is a block diagram showing the arrangement associated with unification of distance information.

FIG. 15 is a block diagram showing the image processor 220 in more detail, and mainly shows the arrangement portion associated with unification of distance information of the object 2 in the image processor 220.

In order to perform unification processing of the distance information of the object 2, as shown in FIG. 15, the image processor 220 comprises a coordinate system converter 121 for converting distance information (Z'(i, j)) from a pair of stereoscopic images 110 calculated by the individual units onto a unified coordinate system, a distance information unificator 122 for unifying the distance information converted onto the unified coordinate system, and a display unit 124 for displaying the unified distance information. The image processor 220 also comprises a unit for outputting occlusion region information to the unificator 122 and the display unit 124, and a unit for detecting the moving amount and direction of the image sensing head device 1, and the like.

Note that "unification" is to set identical points so as to convert each distance information 120 into one viewed from a single coordinate system on the basis of displacement information between two distance information data 120 of the object 2 obtained from at least two arbitrary positions. Also, "unification" implies interpolation processing of coordinates (to be described later), determining the reliability of coordinates of a point or area on the basis of a reliability coefficient obtained from reliability information of the distance information, and the like.

Reliability Determination

The processing sequence of the image head device 1 of the three-dimensional information processing apparatus according to the second embodiment will be described below with reference to the flow chart in FIG. 16.

When the power supply is turned on (step S1) and image signals are input, the controller 210 integrates the image signals obtained from the image separators 105R and 105L using the image processing section 920 to calculate the luminance level of the principal object 2 (step S2). If it is determined that the calculated luminance level is insufficient for three-dimensional shape extraction, the controller 210 turns on the illumination unit 200 (step S3). At this time, the illumination intensity level may be varied in correspondence with the calculated luminance level.

Subsequently, in-focus points are adjusted using the individual image signals set at appropriate luminance level (step S5). At this time, the lenses 100R and 100L are moved to form focal points on both the principal object 2 and the background plane 3, and the iris diaphragms 108R and 108L are adjusted. At that time, when the luminance level changes by a given amount or more, the intensity of the illumination unit 200 is changed to compensate for that change in luminance level. Alternatively, an AGC (auto-gain control) circuit may be assembled to attain electrical level correction. The focusing state is detected by the focusing state detector 270. As a detection method for this purpose, a method of detecting the sharpness of an edge, or the defocus amount may be used.

After the in-focus points are adjusted, zoom ratio adjustment is done (step S6).

Figure 17:
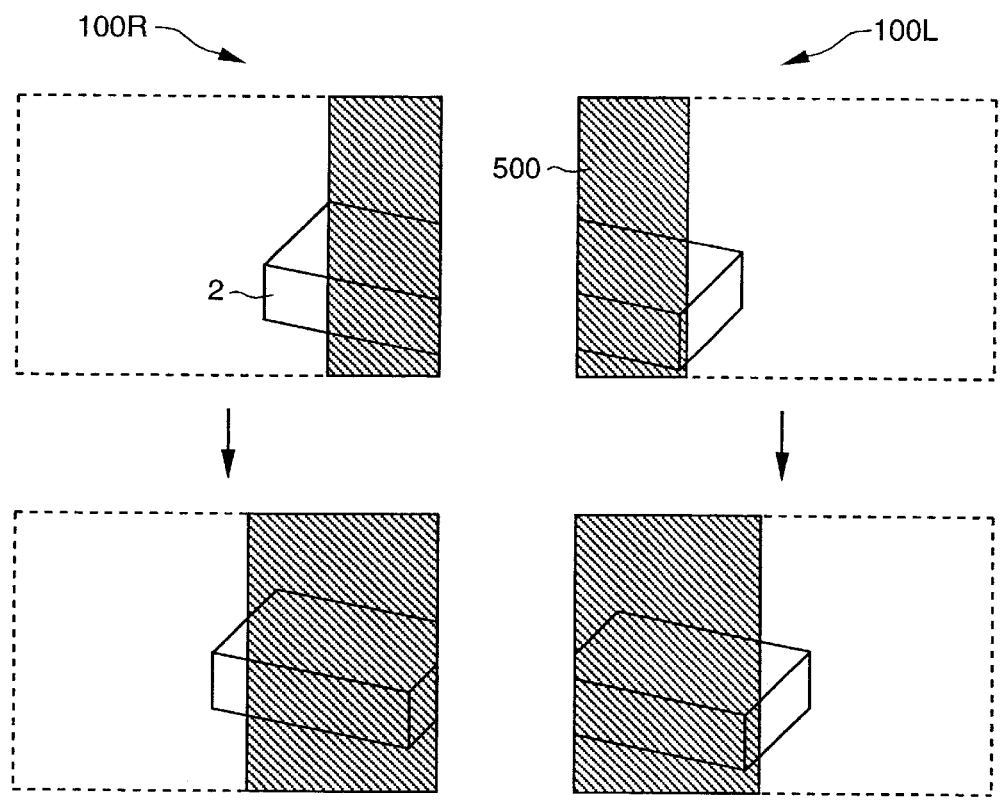
FIG. 17 is an explanatory view of zoom adjustment.

FIG. 17 shows the outline of zoom ratio adjustment in the system of the second embodiment.

In the state wherein the principal object 2 roughly falls within the focal depth, images obtained from the individual image sensing systems 100R and 100L are held in the memory 910 of the controller 210, and the image processing section 920 detects the overlapping region. In this case, correlation calculation processing, template matching processing, or the like is used as the detection method.

As shown in FIG. 17, an overlapping region 500 is detected in the initial state, and thereafter, the controller 210 sets the zoom ratio in a direction to increase the area of the region in the frames of the two image sensing systems and outputs control signals to the zoom controllers 106R and 106L.

Figure 18:
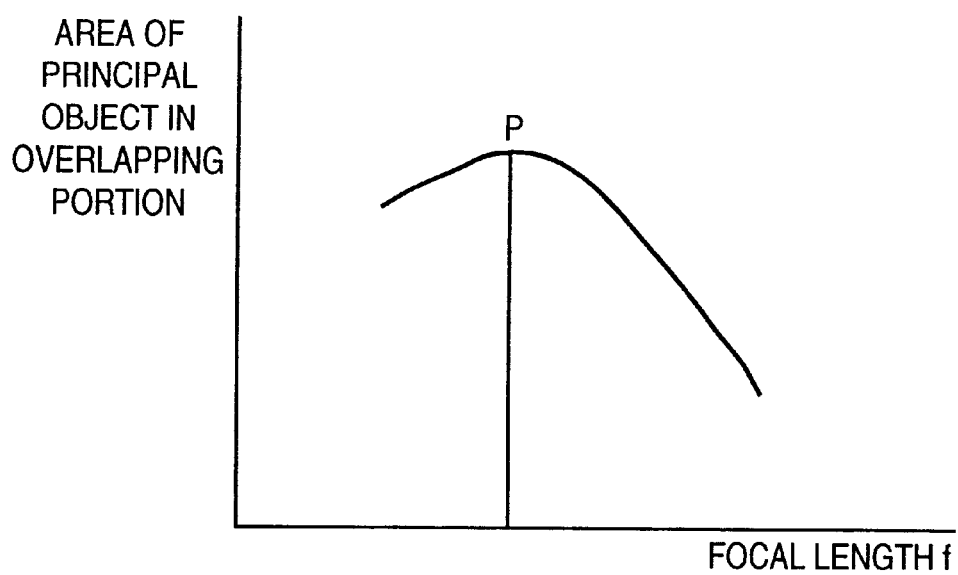
FIG. 18 is an explanatory view of zoom adjustment.

FIG. 18 shows changes in overlapping region in the frame by a series of zoom ratio adjustment processes. In FIG. 18, the image processing section 920 of the controller 210 calculates a focal length f at which the overlapping region has a peak area P in FIG. 18, and control signals are supplied to the zoom controllers 106R and 106L.

Figure 16:
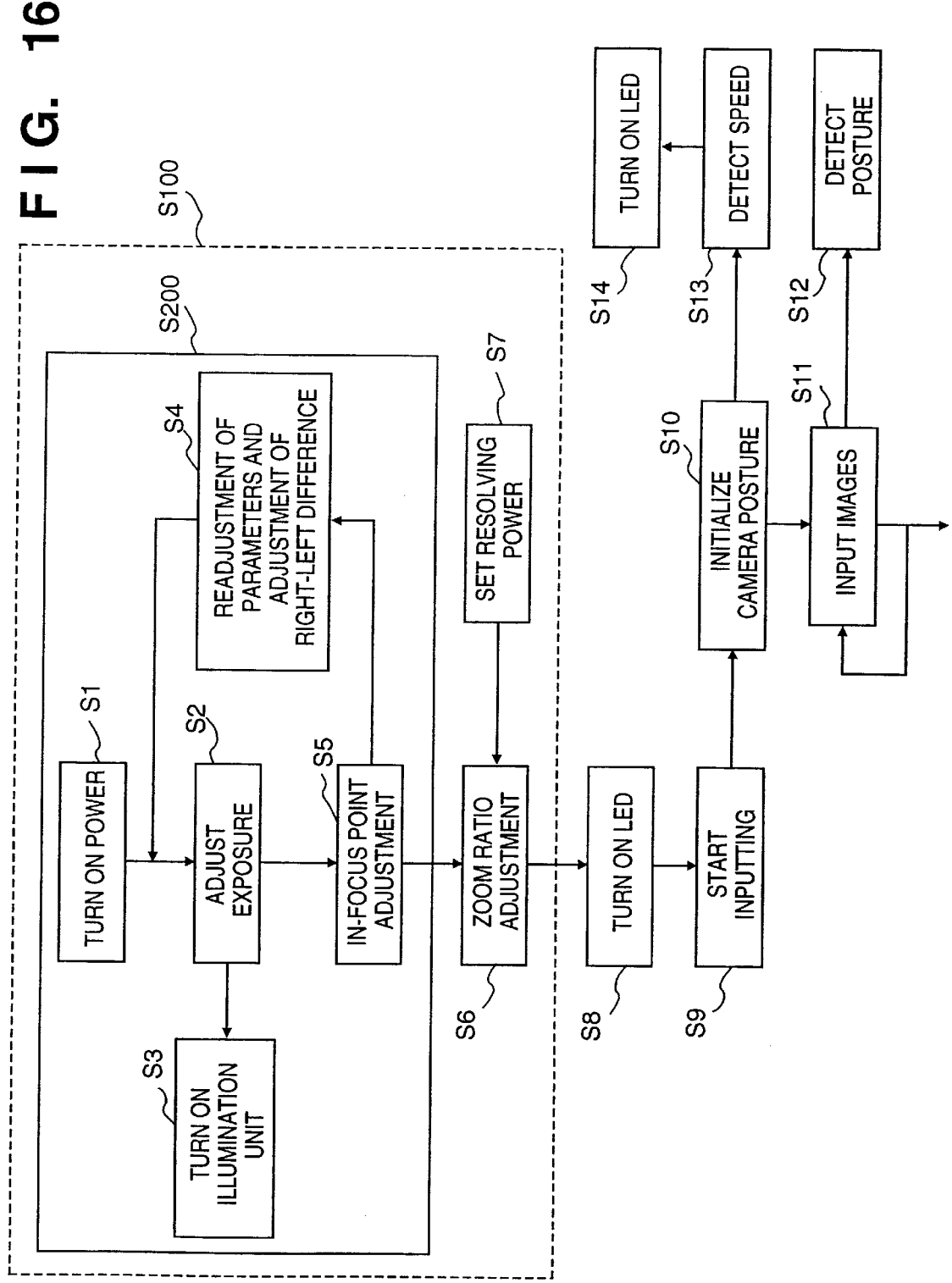
FIG. 16 is a flow chart showing the operation of an image sensing head device 1.

When the focal length f changes by the above-mentioned operation, and consequently, the focal depth range changes by a given amount or more, control signals are supplied to the iris diaphragm controllers 108R and 108L in accordance with step S200 (steps S1 to S5) of readjusting parameters in FIG. 16.

After step S100 (including a series of adjustment steps S1 to S7), readjustment of parameters and adjustment of an R-L difference in step S200 are performed. In the adjustment of the R-L difference, the R-L difference discriminator 260 detects the exposure amounts, in-focus points, and zoom ratios from image signals. Based on the detected signals, the controller 210 supplies control signals to the zoom controllers 106R and 106L, focus controllers 107R and 107L, and iris diaphragm controllers 108R and 108L.

Note that various image sensing parameters upon image sensing include, e.g., the focal length, which can be set by the method (equations (1) to (3)) described in the first embodiment.

After the image sensing parameters are adjusted in steps S100 and S200, the controller 210 supplies a signal to the display unit 240 to inform the user of the end of parameter setting (step S8). Note that the display unit 240 may comprise a display such as a CRT, an LCD, or the like, or may perform simplified indication using an LED or the like. Also, a sound may be produced as well as visual information.

Upon completion of parameter setting, the user presses the release button at appropriate intervals while moving the image sensing head device 1 to input images (steps S9 to S11). In this case, the moving speed, position, and the like of the image sensing head device 1 are also detected (steps S12 to S14).

The method of extracting distance information from stereoscopic images 110 by the image processor 220 is substantially the same as extraction of depth information in the first embodiment.

The corresponding point extraction processing in the second embodiment uses the template matching method as in the first embodiment.

In this manner, edge-emphasized images are subjected to binarization to extract edge components. Note that the binarization is made using an appropriate threshold value.

In the next image extraction processing step, the occlusion region is determined by the occlusion region determining unit 115 on the basis of the calculated corresponding points and an index (e.g., a residual) indicating the degree of correlation used in the process of calculating the corresponding points.

This processing is to add reliability to the results of the corresponding point processing, although the corresponding point processing yields tentative results. Reliability information is added using a correlation coefficient or residual as an index indicating the degree of correlation. If the residual is very large, or if the correlation coefficient is low, it is determined that the reliability of the correspondence is low. The low-reliability portion is processed as an occlusion region or a region without any correspondence.

More specifically, as shown in FIG. 19, if the residual per pixel falls within the range from 0 to 2, the reliability coefficient is 3; if the residual per pixel falls within the range from 2 to 4, the reliability coefficient is 2; and if the residual per pixel is 4 or more, the reliability coefficient is 0. When the reliability coefficient is 0, the corresponding pixel is deleted.

Via the above-mentioned processing steps, the distance information of the object is calculated using the calculated correspondence and the principle of trigonometric measurements. The trigonometric measurements are attained as described above using equation (1).

Subsequently, since the position and image sensing direction of the image sensing head device 1 upon image sensing can be detected from the output from the correction data calculation unit 118, the reliability determining unit 130 determines reliability of the distance information based on the calculation result from the unit 118. The calculated distance information is expressed as a point group on the coordinate system determined by the data of the background plane 3. At this time, when a region between the edge portions as the outputs from the edge extractors 111 undergoes an abrupt change in distance, the corresponding distance information is deleted. This is because when the distance changes abruptly, it is very likely that such portion is recognized as an edge portion.

The distances from the image sensing plane to the individual points are calculated, and the tilt of an area defined by adjacent three points with respect to the image sensing plane is calculated. The tilts of neighboring areas are checked, and if the difference between their tilts is negligibly small, the area is extended until all the areas having the same tilt are combined. Thereafter, reliability information is added to each area. In this case, the area is not extended to an occlusion portion or a portion from which the distance information is deleted. At this time, information as a point group may be held, but is preferably deleted to compress the information volume.

The reliability information is determined and added in correspondence with the angle with respect to the image sensing plane and the residual, as shown in FIG. 20.

In the case of FIG. 20, when the angle with respect to the image sensing plane falls within the range from 0° to 30° and the residual falls within the range from 0 to 2, the reliability coefficient is 3 which indicates the highest reliability. On the other hand, when the angle with respect to the image sensing plane falls within the range from 80° to 90° and the residual falls within the range from 2 to 4, the reliability coefficient is 0 which indicates the lowest reliability. The data of the area with the reliability coefficient=0 may be deleted as unreliable data.

In this manner, reliability data is added to each area as 2-bit information having different reliability coefficients 3, 2, 1, and 0 in correspondence with the angle of the area. Thereafter, three-dimensional shape information is recorded in the recorder 250 after it is converted into an appropriate format.

As described above, since image sensing is performed at a plurality of positions $A_0$ to $A_n$, all the sensed images do not always include the background plane 3 with a size large enough to precisely obtain characteristic points. For this reason, reliability information is added in correspondence with the ratio of the background plane 3 to the image sensing region. The background plane 3 can be detected by the image separator 105. For example, when the ratio falls within the range from 100 to 30%, the reliability coefficient is 3; when the ratio falls within the range from 30 to 15%, the reliability coefficient is 2; and when the ratio is 15% or less, the reliability coefficient is 1. When the image sensing region includes almost no pad image of the background plane 3, since the reference coordinate system cannot be determined, distance information must be unified using, e.g., texture information. Accordingly, in such case, a low reliability coefficient is set since reliability may be impaired otherwise. The reliability coefficient determined based on the angle with respect to the image sensing plane and the residual is changed in correspondence with that reliability coefficient, and the changed coefficient is added to the distance information as a new reliability coefficient.

A distance image obtained from the right and left images can be displayed on the monitor 8. The image displayed at that time can be selected from a natural image, line image, and polygon image, as described above, and in any one of the display patterns, reliability information can be displayed at the same time. A natural image is displayed while the luminance of each region is changed in correspondence with the reliability coefficient. On the other hand, a line image is displayed while changing the thickness or type of lines (e.g., a solid line, broken line, chain line, and the like). Also, a polygon image is displayed by changing the colors of polygons. In this manner, the reliability information can be displayed at the same time.

The time-series unification processing of the distance information obtained as described above will be described below with reference to FIG. 15.

Distance information 120 is time-serially generated based on the obtained stereoscopic images 110, while the unit for detecting the moving amount, direction, and the like of the image sensing head device 1 sends that information. The coordinate system converter 121 converts the distance information onto a unified coordinate system using such information by the processing method (to be described later). Converting the distance information allows easy unification of information obtained time-serially.

Subsequently, a plurality of distance information converted onto the unified coordinate system are unified. Upon unification, the reliability information is used. For example, assuming that two distance information data are obtained, and they have different reliability coefficients in their overlapping portion, the information with a higher reliability is selected. Or information may be unified while being weighted in correspondence with their reliability coefficients. When three or more overlapping region data are present, unification is similarly done in correspondence with the reliability coefficients. Thereafter, the reliability coefficient is added to the unified distance information. Since data with higher reliability is selected upon unification, the reliability of the unified distance information can be improved.

As shown in FIG. 15, the unificator 122 of the second embodiment executes processing for removing identical points and intermediate point correction processing as in the first embodiment.

In the system of the second embodiment, since the "unified coordinate system" used in the above-mentioned unification processing is explained by FIGS. 12 and 13 as in the first embodiment, a detailed description thereof will be omitted.

The unified distance information can be displayed on the monitor 8. The three-dimensional shape of the object viewed from an arbitrary view point can be observed by operating the operation unit 11. At this time, the reliability information can be displayed at the same time as in the case wherein the distance information obtained from the right and left images is displayed. With this display, since a low-reliability region can be determined at a glance, the user can recognize the region to be additionally sensed, and can perform additional image sensing.

<Modification of Second Embodiment>Third Modification

The third modification of the second embodiment will be explained below.

Figure 21:
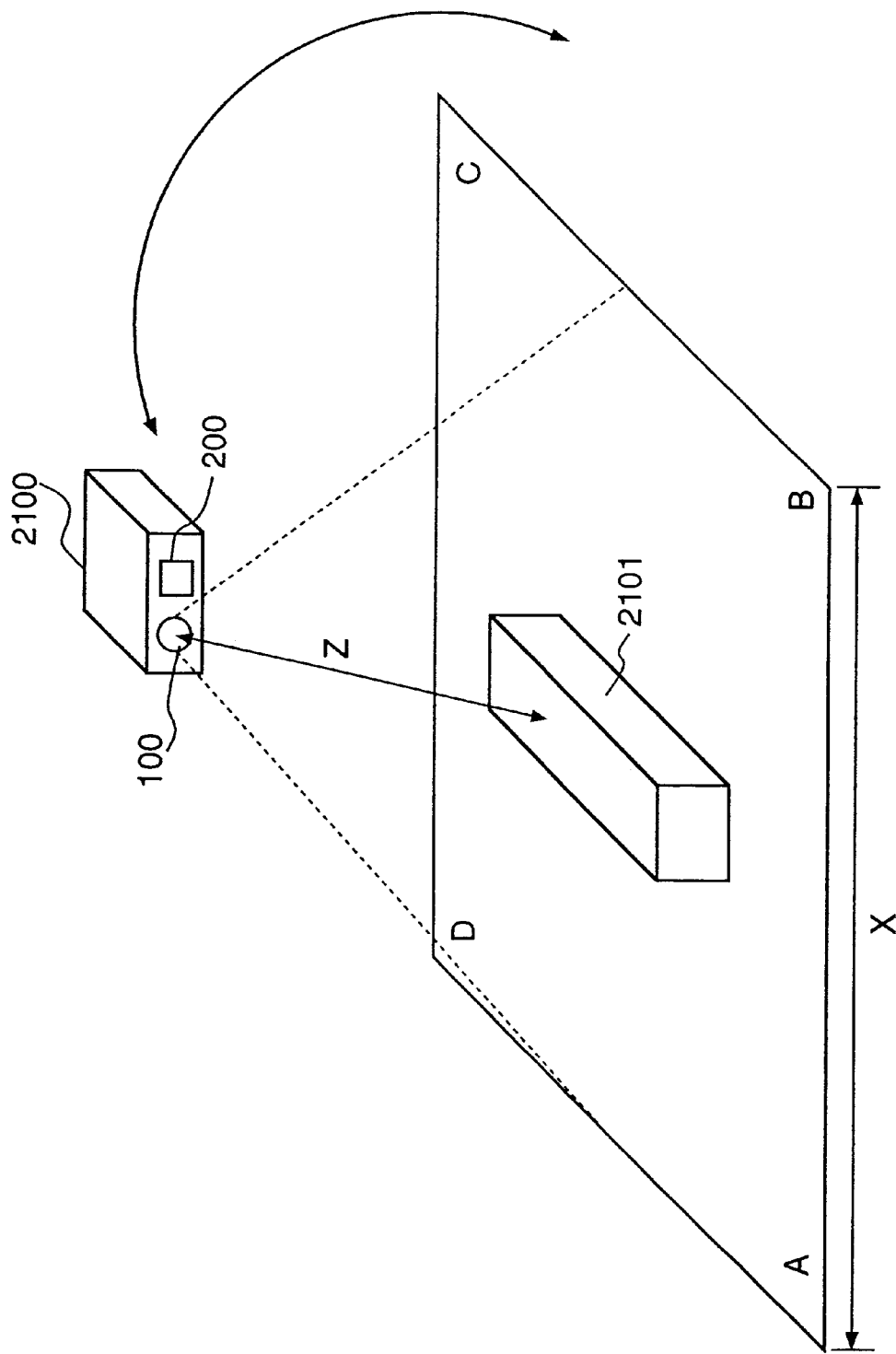
FIG. 21 is an explanatory view of a three-dimensional information processing apparatus according to the third modification of the second embodiment.

FIG. 21 shows the outline of the third modification. Referring to FIG. 21, reference numeral 2101 denotes a principal object; 2100, a three-dimensional shape extractor of the three-dimensional information processing apparatus; 100, an image sensing lens; and 200, an illumination unit. Also, reference numeral 2102 denotes a calibration pad. The three-dimensional shape extractor detects the posture based on the image of this pad. Note that letters A, B, C, and D on the pad 2102 serve as markers used for detecting the posture of the extractor 2100. The posture of the camera can be calculated based on the directions of these markers, distortions of marker images, and the like.

Figure 22:
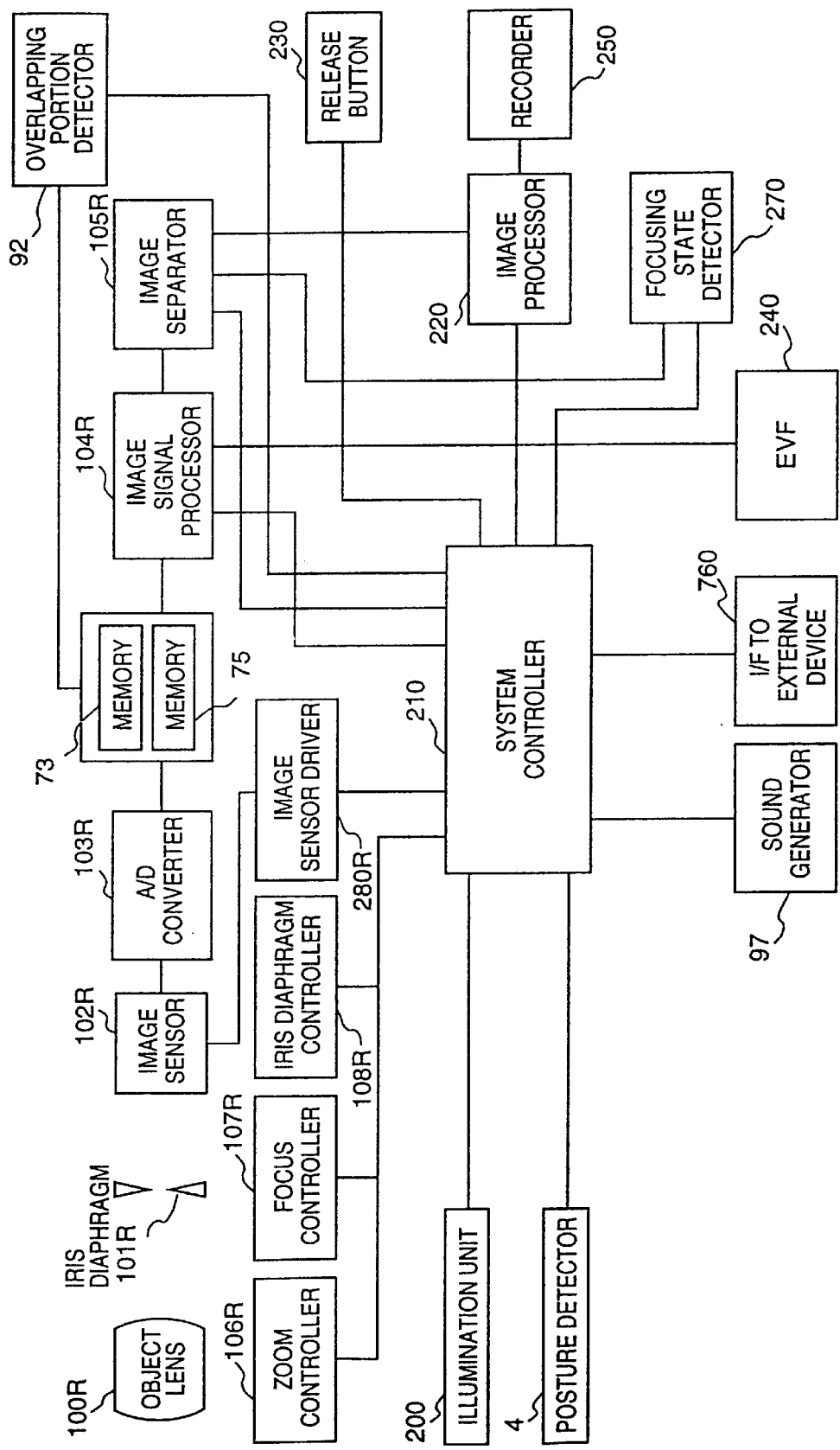
FIG. 22 is a block diagram showing the arrangement of a three-dimensional shape extractor 12 according to the third modification in detail.

FIG. 22 is a block diagram showing the three-dimensional shape extractor 2100 according to the third modification in detail. Note that the components denoted by the same reference numerals in FIG. 22 except for symbols R and L have the same functions and operations as those in the second embodiment, and a detailed description thereof will be omitted. As shown in FIG. 22, the three-dimensional shape extractor 2100 has substantially the same functions and operations as those in the second embodiment, except that it has a single-lens arrangement.

The operation in the third modification will be explained below.

Since the apparatus of the third modification attains posture detection in combination with the pad 2102, the image of the pad 2102 must be obtained within an appropriate range upon image sensing. The image separator 105 performs calculations or template matching between the pre-stored feature portions (the four corners A, B, C, and D in FIG. 21) and an image which is being currently sensed, and outputs the detection signal to the system controller 210. The system controller 210 sets the focal length so that the image of the pad 2102 falls within an appropriate range in the field of view. At the same time, the system controller 210 holds the focal length information in its memory 910.

With this processing, since the image of the entire pad is kept within the field of view, the posture can always be detected based on the shapes of the markers. Also, since the image of the entire pad always falls within the field of view, reliability can be improved in the corresponding point extraction processing. Since the principal object 2101 is present in front of the pad, if the calculated distance information exceeds the pad, that calculation result can be deleted. Also, since the pad region can be determined, the search region for extracting corresponding points can be limited, and consequently, a large template size can be used to improve precision for corresponding point extraction.

Figure 23:
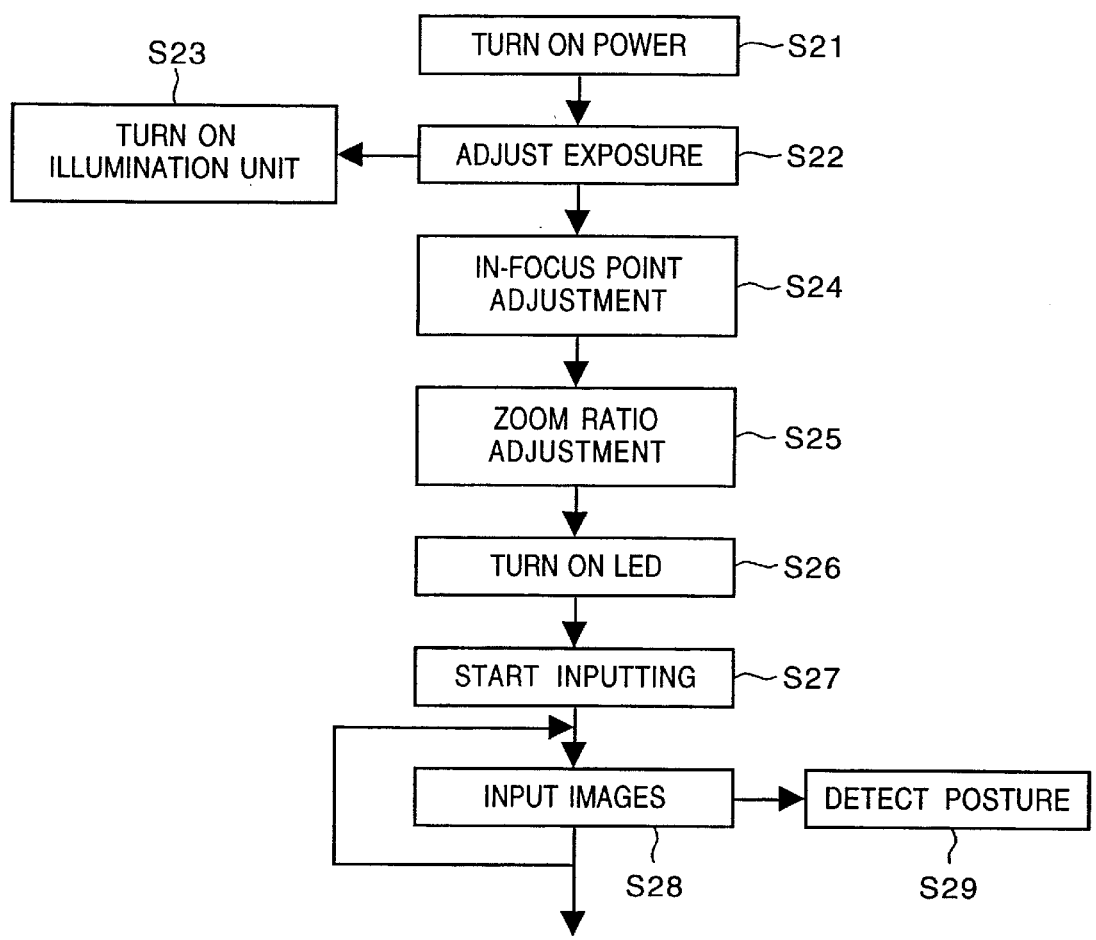
FIG. 23 is a flow chart showing the operation of an image sensing head device 1 according to the third modification.

FIG. 23 is a flow chart showing the operation of the three-dimensional information processing apparatus according to the third modification.

As shown in the flow chart in FIG. 23, when the power supply is turned on, and various parameters of the optical system such as an exposure condition, in-focus point adjustment, and the like are set (steps S21 to S25), an LED of the display unit 240 is turned on (step S26) to inform the user of the input ready state. In response to this indication, the user starts input (step S27) and presses the release button 230 at appropriate intervals while moving the extractor 2100 so as to input images (step S28). At this time, the system controller 210 sets the focal length on the basis of information from the image separator 105 so that the characteristic portions of the pad 2102 including the principal object fall within an appropriate range in the field of view. At the same time, the system controller 210 stores image sensing parameter information including the focal lengths at the individual image sensing positions in the memory 910. The posture detector 4 detects the posture based on the states of the characteristic portions (step S29).

The image processor 220 reads out a plurality of image signals held in image memories 73 and 75, and converts and corrects images into those with an identical focal length on the basis of the image sensing parameter information held in the memory 910 of the system controller. Furthermore, the image processor 220 extracts the object shape using the corrected image signals and the posture signal detected by the posture detector 4.

Thereafter, reliability information is added to the obtained three-dimensional shape information. In the third modification, the reliability information is determined and added in correspondence with the angle with respect to the image sensing plane and the distance from the image sensing plane, as shown in FIG. 24.

In the case of FIG. 24, when the angle with respect to the image sensing plane falls within the range from 0° to 30° and the object distance falls within the range from 10 cm to 30 cm, the reliability coefficient is 3, and this value indicates the highest reliability. On the other hand, when the angle with respect to the image sensing plane falls within the range from 80° to 90° and the object distance is 60 cm, the reliability coefficient is 0, and this value indicates the lowest reliability. The data of an area with the reliability coefficient=0 may be deleted. In this manner, reliability data is added as 2-bit information to each area.

The three-dimensional shape information added with the reliability information is supplied to the recorder 250. The recorder 250 converts the input signal into an appropriate format, and records the converted signal.

<Advantages of Second Embodiment>

As described in detail above, according to the second embodiment, since the reliability of the extracted three-dimensional shape information is determined on the basis of the angle of the object with respect to the image sensing plane, the object distance, and the image correspondence that can be discriminated from the residual or correlation, the reliability of the obtained three-dimensional shape information can be improved. When the three-dimensional shape information is processed and displayed in correspondence with the reliability, the user can be visually informed of the reliability.

In the second embodiment and third modification, the reliability is determined using the residual or correlation upon extracting corresponding points, the angle of the object with respect to the image sensing plane and object distance, the ratio of the pad image with respect to the image sensing region, and the position information of the pad. In addition to them, the reliability of the obtained three-dimensional shape can also be determined using light emitted by a light source and reflected by the object and the angle of the pad with respect to the image sensing plane.

A case using light emitted by a light source and reflected by the object will be explained below.

Light reflected by the object can be discriminated to some extent on the basis of the luminance information of image signals. This is because when the reflectance of the object is high, the luminance becomes very high over a certain range at the position where the reflected light enters the lens. The portion with the high luminance is removed as that obtained by reflection. More specifically, threshold values are determined in correspondence with the respective luminance levels, and the reliability coefficients of 0 to 3 are determined in accordance with the threshold values.

A case using the angle of the pad with respect to the image sensing plane will be explained below.

In this case, the reliability coefficients are added in correspondence with the angle of the pad like in a case wherein the reliability coefficients are set in correspondence with the angle of the object with respect to the image sensing plane. This utilizes the fact that if the reliability of the reference coordinate system is low, the three-dimensional shape on the reference coordinate system also has low reliability since the reference coordinate system is obtained from the pad. For example, when the angle of the object falls within the range from b 0° to 60°, the reliability coefficient is 3; when the angle of the pad falls within the range from 60° to 75°, the reliability coefficient is 2; when the angle of the pad falls within the range from 75° to 85°, the reliability coefficient is 1; and when the angle of the pad falls within the range from 85° to 90°, the reliability coefficient is 0. The reason why the pad angle detection is set to have higher reliability than the object angle detection is that the angle can be precisely calculated from a plurality of data by, e.g., the method of least squares since the pad is recognized as a plane in advance.

In the above description, the reliability coefficient is 2-bit information, but the number of bits may be increased as needed.

As described above, according to the second embodiment, since the reliability of the extracted three-dimensional shape information is determined on the basis of the angle of the object with respect to the image sensing plane, the object distance, and the image correspondence that can be discriminated from the residual or correlation, the reliability of the obtained three-dimensional shape information can be improved. When the three-dimensional shape information is processed and displayed in correspondence with the reliability, the user can be visually informed of the reliability.

<Third Embodiment>

The third embodiment aims at improving the image sensing timing.

Figure 1:
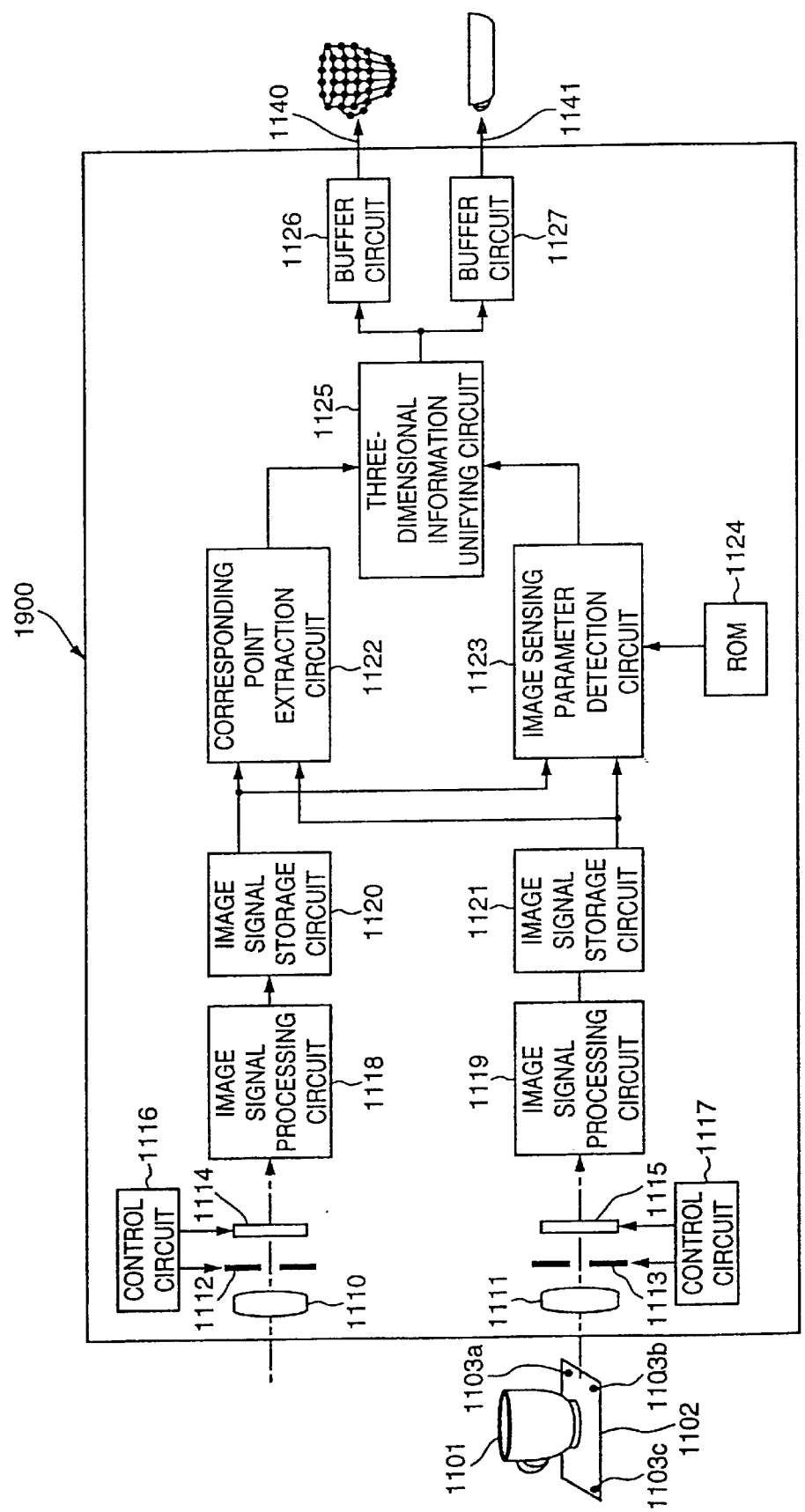
FIG. 1 is a schematic block diagram showing the arrangement of a conventional three-dimensional information processing apparatus.
Figure 25:
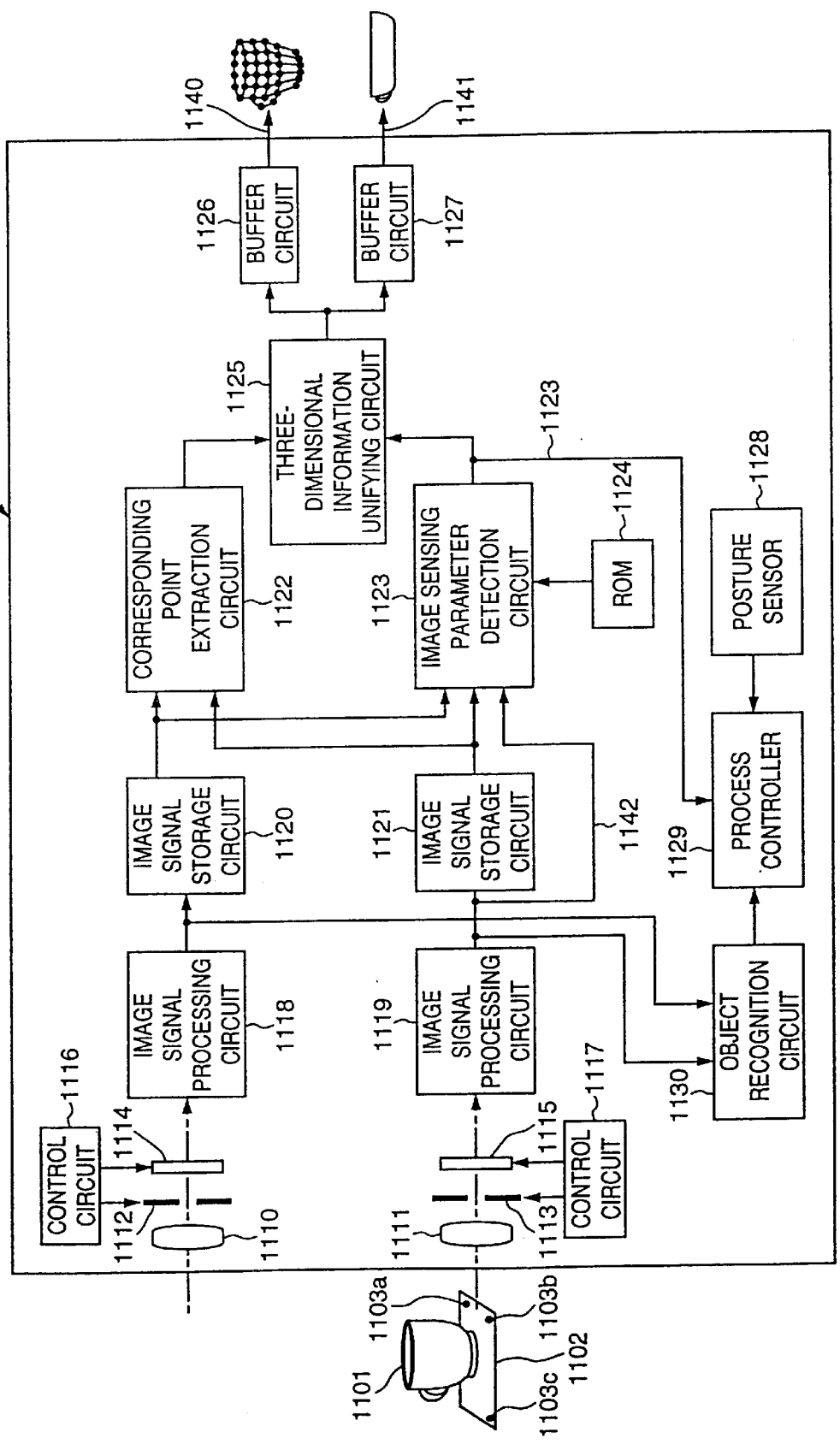
FIG. 25 is a block diagram showing the arrangement and use state of an image sensing apparatus according to the third embodiment of the present invention.

FIG. 25 is a diagram showing the arrangement and use state of an automatic image sensing apparatus 1100 as an image sensing apparatus according to the third embodiment of the present invention. In FIG. 25, the same reference numerals denote the same parts as in the previously described prior art shown in FIG. 1. The differences in FIG. 25 from FIG. 1 are that a posture sensor 1128, a process controller 1129, and an object recognition circuit 1130 are added to the arrangement shown in FIG. 1. In FIG. 25, reference numerals 1142 and 1143 denote signal lines.

In the automatic image sensing apparatus 1100 of the present invention, a plurality of means can be used as image sensing condition detection means and, for example, the posture sensor 1128, an image sensing parameter detection circuit 1123, the object recognition circuit 1130, and a corresponding point extraction circuit 1122 in FIG. 25 correspond to such means.

The operation when these constituting elements are used will be explained below.

The operation in the simultaneous processing mode will be exemplified below.

In the automatic image sensing apparatus 1100, the posture sensor 1128 always detects the rotation angle and moving amount of the apparatus 1100, and the process controller 1129 process-controls to input image signals to storage circuits 1120 and 1121 every time the automatic image sensing apparatus 1100 changes to a predetermined position and by a predetermined angle. When the posture sensor 1128 detects that the apparatus 1100 has completed one revolution around an object 1101, the process controller 1129 reads out images from the image signal storage circuits 1120 and 1121, and starts simultaneous processing of the corresponding point extraction circuit 1122, the image sensing parameter detection circuit 1123, and a three-dimensional information unifying circuit 1125.

Figure 26:
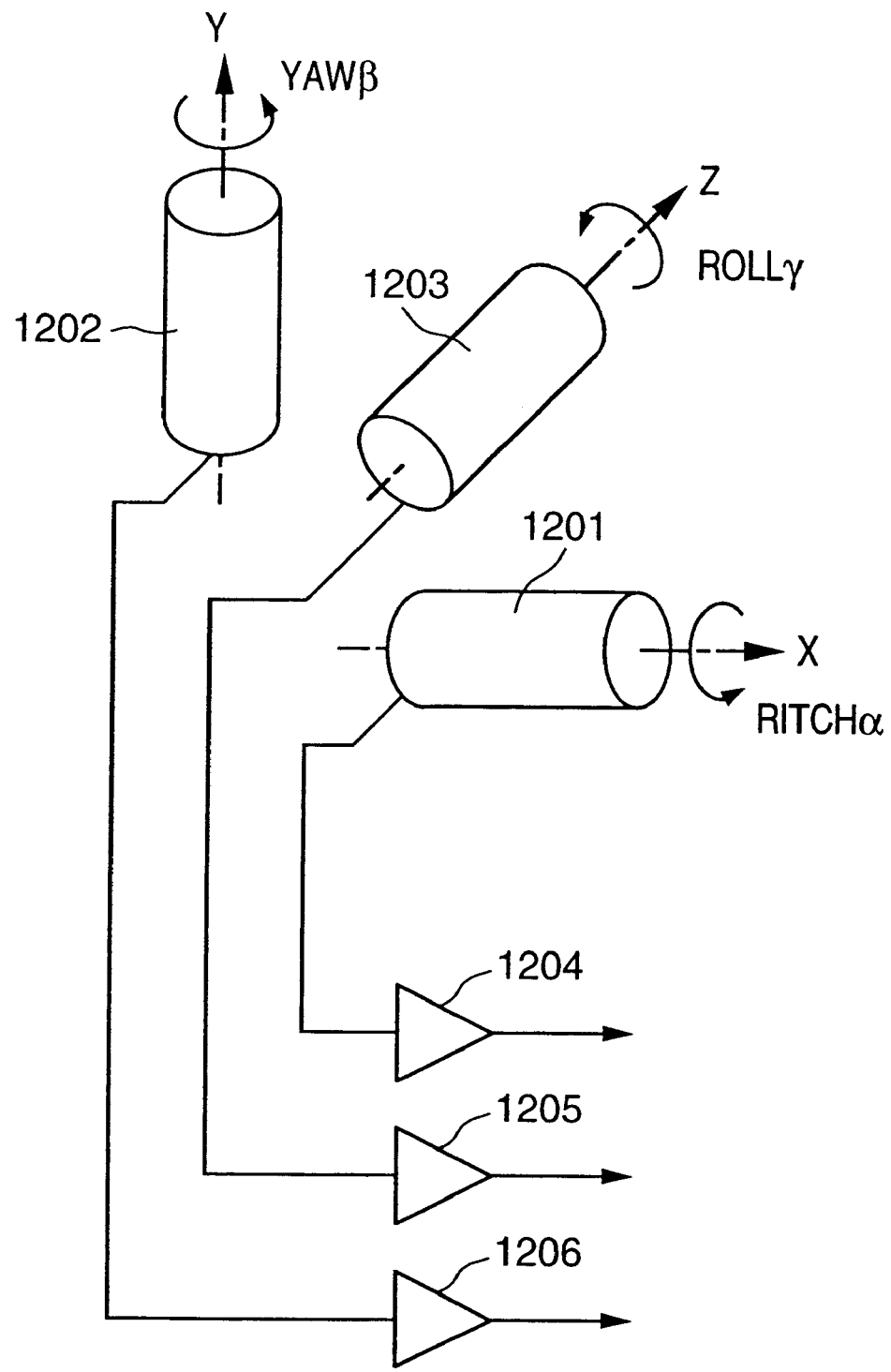
FIG. 26 is a diagram showing the arrangement of a posture sensor according to the third embodiment.

FIG. 26 shows the arrangement of the posture sensor 1125 in detail. As shown in FIG. 26, three small vibration gyros 1201, 1202, and 1203 are arranged so that their axes extend in directions perpendicular to each other, and independently detect the rotation angular velocities (pitch, yaw, and roll) of the automatic image sensing apparatus 1100. Integrators 1203, 1204, and 1205 respectively integrate the detected values, and convert them into rotation angles of the automatic image sensing apparatus 1100. When the photographer performs image sensing so that an object 1101 always falls within the frame, the rotation angles of the automatic image sensing apparatus 1100 itself substantially match information indicating the degree of revolution of the automatic image sensing apparatus 1100 around the object 1101. Based on such information, when the pitch or yaw angle has changed by a predetermined angle, the process controller 1129 controls to store images. Although changes in the roll direction are not directly used in process control, if the automatic image sensing apparatus 1100 rolls considerably and both pitch information and yaw information are mixed and output, the roll information is used for accurately separating these outputs. The merits of the arrangement using the angular velocity sensors are a very compact arrangement, high sensor sensitivity, and very high precision owing to only one integration.

The posture sensor 1128 may be constituted by acceleration sensors to detect accelerations.

Figure 27:
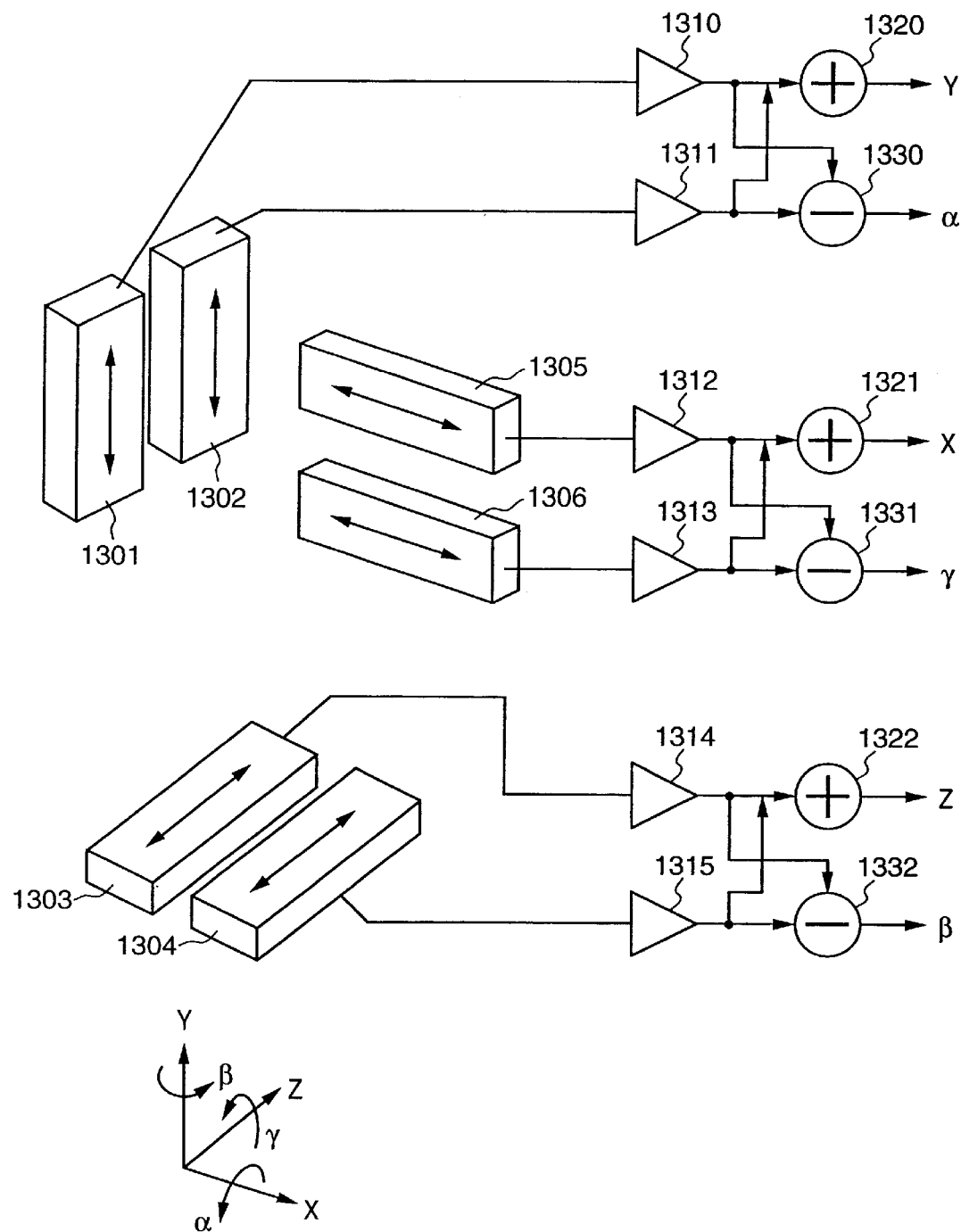
FIG. 27 is a diagram showing the arrangement of acceleration sensors that make up the position sensor of the third embodiment.

FIG. 27 shows the layout of acceleration sensors 1301, 1302, 1303, 1304, 1305, and 1306 that make up the posture sensor 1128. In general, since an acceleration sensor detects linear vibrations, a pair of sensors are arranged parallel to each other. Reference numerals 1310 to 1315 respectively denote integrators each for performing integration twice. Each integrator integrates the corresponding acceleration sensor output twice to calculate the position moving amount. When the integral outputs from a channel consisting of a pair of acceleration sensors are added to each other, translation components (X, Y, Z) in the attachment direction of the pair of acceleration sensors can be obtained; when the outputs are subjected to subtraction, rotation components (α, β, γ) can be obtained. To attain such calculations, adders 1320, 1321, and 1322, and subtractors 1330, 1331, and 1332 are arranged.

The process controller 1129 checks the moving amount of the automatic image sensing apparatus 1100 relative to the object 1101 to control the image input timings to the image signal storage circuits 1120 and 1121. Although this detection method requires a complicated sensor arrangement, since all the degrees of freedom (horizontal X, vertical Y, back-and-forth Z, pitch α, yaw β, and roll γ) of the automatic image sensing apparatus 1100 can be detected at the same time, changes in view point with respect to the object 1101 can be accurately detected.

Furthermore, as for some methods for detecting the relative position relationship between two objects in a non-contact manner, "Survey of helmet tracking technologies" SIP Vol. 1456 Large-Screen-Projection, Avionics, and Helmet-Mounted Displays (1991) p. 86 (to be referred to as a reference hereinafter) has descriptions about the principles, characteristics, and the like of the individual methods.

Such principles can be applied to the posture sensor 1128 of the automatic image sensing apparatus 1100. This reference describes the principle of analyzing relative position on the basis of bright point images sensed by a camera. When such technique is applied to the automatic image sensing apparatus 1100, the image sensing parameter detection circuit 1123 is controlled to operate all the time using the signal lines 1142 and 1143 in FIG. 25 without going through the image signal storage circuits 1120 and 1121. The image sensing parameter detection circuit 1123 analyzes an image of a known bright point pattern, and detects the moving amount and posture of the automatic image sensing apparatus 1100.

Figure 28:
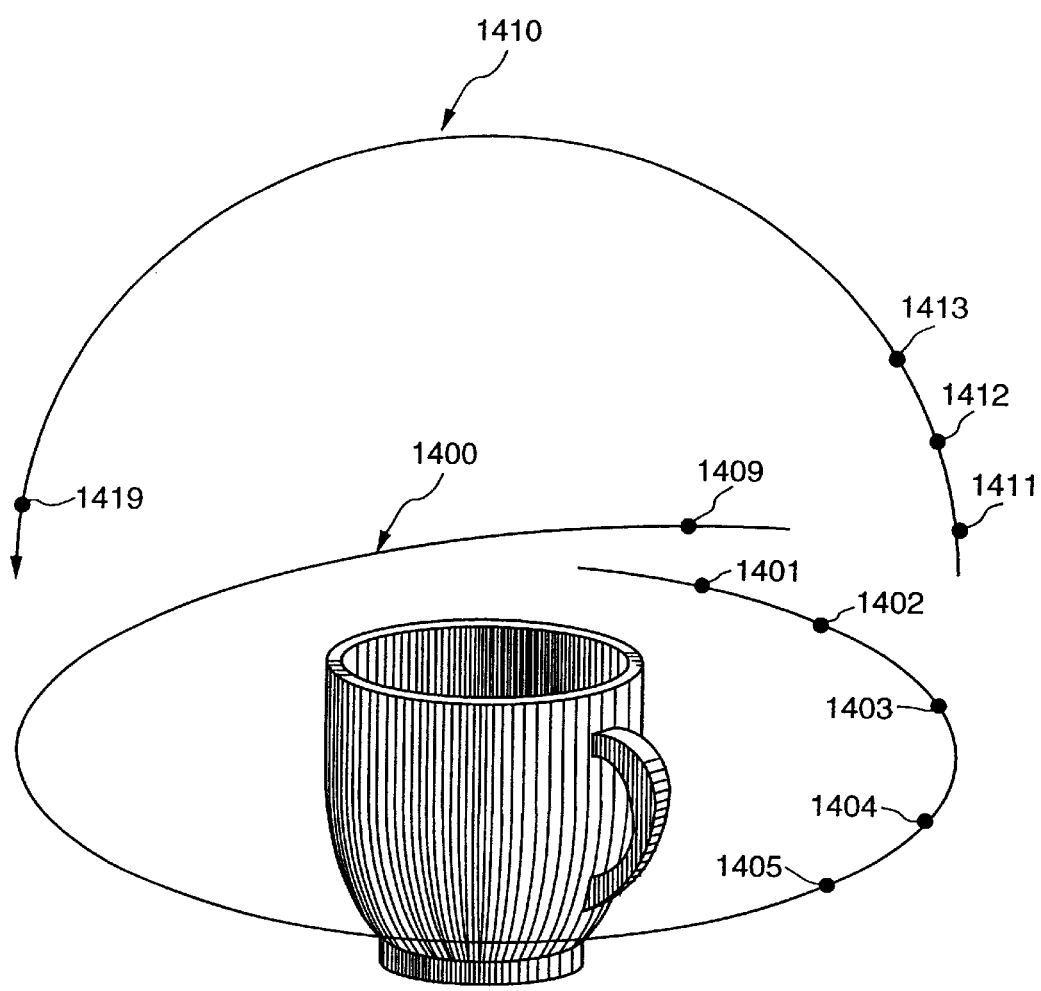
FIG. 28 is a view showing an example of the image input timings of the third embodiment.

FIG. 28 shows an example of the image storage timings of the automatic image sensing apparatus 1100.

In FIG. 28, reference numeral 1400 denotes a path formed when the photographer manually holds and moves the automatic image sensing apparatus 1100 around the object 1101. Reference numeral 1401 denotes an image sensing start position, which corresponds to the storage timing of the first image.

Also, reference numerals 1402, 1403, 1404, 1405, . . . , 1409 denote the detection timings of changes, by a predetermined amount, in X- or Y-direction or in rotation angle α or β under the assumption that the image sensing system points in the direction of the object 1101, and images are stored at the timings of these positions 1402, 1403, 1404, 1405, . . . , 1409.

At the timing of the position 1409 corresponding to the end of one revolution, the coordinate X and the rotation angle β assume values equal to those at the position 1401, but other values (Y, Z, α, γ) do not always match those at the position 1401. However, in the automatic image sensing apparatus 1100, the start and end points need not always strictly match, and when Y, Z, and α are smaller than predetermined values, image input is terminated when X and β match those at the start point.

The automatic image sensing apparatus 1100 need always be moved in a plane (e.g., the path 1400 in FIG. 28) parallel to the ground to perform image sensing. For example, an image sensing method of moving the apparatus 1100 above the object 1101 may be used.

In FIG. 28, reference numeral 1410 denotes a path when the photographer manually holds and moves the automatic image sensing apparatus 1100 above the object 1101 to perform image sensing. Reference numerals 1411, 1412, 1413, . . . , 1419 denote storage timing positions. In this image sensing mode, the values Y and α are detected in place of X and β to perform image input control, and when a has changed 180°, the image input is stopped.

Figure 29A:
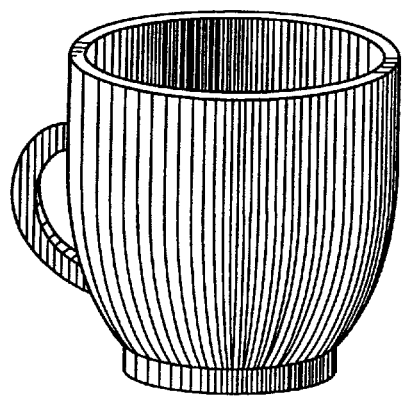
FIGS. 29A to 29C show examples of sensed images in the third embodiment.
Figure 29B:
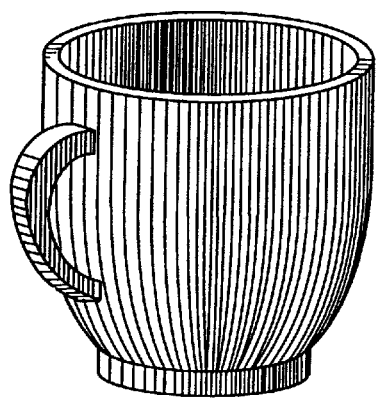
Figure 29C:
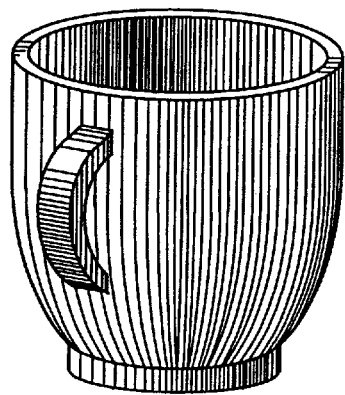

FIGS. 29A to 29C show an example of input images obtained when the image input is made at the timings of the positions 1401 to 1405. As can be seen from FIGS. 29A to 29C, time-serial images obtained by viewing the object 1101 in turn from slightly different view points are obtained.

FIGS. 30A to 30C show an example of the image input timings different from those in FIGS. 29A to 29C. In an image sensing mode of this example, an image sensing unit set with a large image sensing magnification is used, so that the object 1101 falls outside the frame. In this mode, the automatic image sensing apparatus 1100 is moved in roughly the X-direction to perform image sensing. In such image sensing mode, when the overlapping region with the previously sensed image in each frame reaches a predetermined area, i.e., at the timing at which each hatched portion in FIGS. 29A to 29C reaches the predetermined area, the sensed images are stored in the image signal storage circuits 1120 and 1121. In this mode, since a large image sensing magnification is set, the image and shape of the object 1101 can be analyzed in detail, and continuous images can be stably input under the control of the process controller 1129.

In the above description, signal storage and process control operations are attained based on the position and angle of the automatic image sensing apparatus 1100. Also, the storage and process control operations may be attained by analyzing the image itself of the object 1101, as will be described below.

For example, the object recognition circuit 1130 shown in FIG. 25 is used. The object recognition circuit 1130 detects changes in object image from changes over time in image signal. For example, the difference from a past image is detected, and when the difference reaches a predetermined value, image signals are input. Since this method does not directly detect the movement of the automatic image sensing apparatus 1100, the processing timing precision is low, but since the processing is simple and no extra sensor is required, the entire automatic image sensing apparatus 1100 can be rendered compact.

Furthermore, the corresponding point extraction circuit 1122 in FIG. 25 may operate all the time, and distance image data output from this corresponding point extraction circuit 1122 may be analyzed to attain process control. When the automatic image sensing apparatus 1100 has been moved by a predetermined amount, the detected distance image changes accordingly. When time changes in distance image reach a predetermined amount, image input can be performed. In this method, when the object 1101 has a large uneven portion, a large signal is output even when changes in position of the image sensing system are small. For this reason, image sensing is controlled for such uneven portion at short intervals, otherwise, image sensing is controlled at long intervals. In general, since the shape of such uneven portion is to be analyzed in detail, images can be input more efficiently according to this method.

Similarly, a method of using an error signal output from the corresponding point extraction circuit 1122 in FIG. 25 is also available. Note that the error signal is information which indicates a pixel position where corresponding points cannot be normally detected upon detecting corresponding points in image signals obtained from the right and left image sensing units in units of pixels. Such phenomenon occurs when so-called occlusion has occurred, i.e., a portion that can be viewed from one image sensing unit cannot be viewed from the other image sensing unit, when the illumination conditions of the right and left image sensing units are considerably different from each other, e.g., when directly reflected light from the illumination unit enters only one image sensing unit, when the surface of the object 1101 is flat and has no texture, and corresponding points cannot be detected, and so on. However, such image sensing conditions may allow corresponding point extraction and may not cause any errors if the view point of the image sensing apparatus is changed.

In the automatic image sensing apparatus 1100, process control is performed at a timing at which such error output of the corresponding point extraction circuit 1122 time-serially changes, so as to input images. In this method, as the characteristic information of the object 1101, which cannot be accurately detected at a certain timing due to, e.g., occlusion, can be compensated for by an image at another timing, the three-dimensional shape of even an object with a large unevenness can be efficiently extracted.

The processing flow controlled by the process controller 1129 will be described below.

In the above description, the image input timings to the image signal storage circuits 1120 and 1121 in the simultaneous processing mode have been explained. The automatic image sensing apparatus 1100 also has a sequential processing mode for performing shape extraction processing while sensing images of the object 1101. In this case as well, when an unnecessarily large number of images are to be processed, the calculation volumes of the corresponding point extraction circuit 1122, the image sensing parameter detection circuit 1123, and the three-dimensional information unifying circuit 1125 increase, and output data from the signal lines 1140 and 1141 become large. As a consequence, the buffer circuits 1126 and 1127 require a large storage capacity.

In view of this problem, using the output from the above-mentioned posture sensor 1128 and information of the sensed images, the process controller 1129 controls the processing start timings of the corresponding point extraction circuit 1122, the image sensing parameter detection circuit 1123, and the three-dimensional information unifying circuit 1125. More specifically, when the automatic image sensing apparatus 1100 is moved along the path 1400 in FIG. 28, the images sensed at the position 1401 are processed by the corresponding point extraction circuit 1122 and the image sensing parameter detection circuit 1123 to extract a distance image. Subsequently, even when the processing has ended before the apparatus 1100 is moved to the position 1402, images acquired during the movement are not processed, and the corresponding point extraction circuit 1122 and the image sensing parameter detection circuit 1123 are stopped. During this interval, image signals obtained from image sensing elements 1114 and 1115 are discarded or shutters 1112 and 1113 are closed to stop scanning of the image sensing elements 1114 and 1115. With this control, the consumption power of the image processing circuits and the peripheral circuits of the image sensing elements 1114 and 1115, which consume large electric power, can be reduced. Subsequently, when the automatic image sensing apparatus 1100 is located at the position 1402 in FIG. 28, the processing of the corresponding point extraction circuit 1122, the image sensing parameter detection circuit 1123, and the three-dimensional information unifying circuit 1125 is started in synchronism with the beginning of vertical scanning of the image sensing elements 1114 and 1115.

When the moving speed of the automatic image sensing apparatus 1100 is high and processing cannot be done within a given period, images that cannot be processed are sequentially stored in the image signal storage circuits 1120 and 1121. The process controller 1129 transfers the next images from the image signal storage circuits 1120 and 1121 by detecting the end of processing in the corresponding point extraction circuit 1122 and the image sensing parameter detection circuit 1123.

The above-mentioned embodiment has exemplified a case using two image sensing units. The image input timing control of the present invention can be similarly applied to an apparatus which analyzes the three-dimensional shape using a single image sensing unit.

As described above, according to the image sensing apparatus of the third embodiment, since the image input control and processing start control are done in correspondence with the position/angular relationship between the object 1101 and the image sensing apparatus 1100 and changes in object image, the capacities of the image signal storage circuits 1120 and 1121 and the buffer circuits 1126 and 1127 can be minimized, and complicated image processes can be attained within a minimum required time.

<Modification of Third Embodiment> . . . Fourth Modification

The fourth modification of the third embodiment of the present invention will be described with reference to FIGS. 31 and 32.

The fourth modification is applied to a system in which a plurality of image information sensed by moving around an object are directly stored, and the input image is selected and displayed as it is in place of a CG image. The following description will exemplify a case wherein two image sensing units are used to easily obtain sense of reality, and a stereoscopic image is displayed on a stereoscopic display. However, the image input timing control of the present invention can also be applied to a system using a single image sensing unit.

Figure 31:
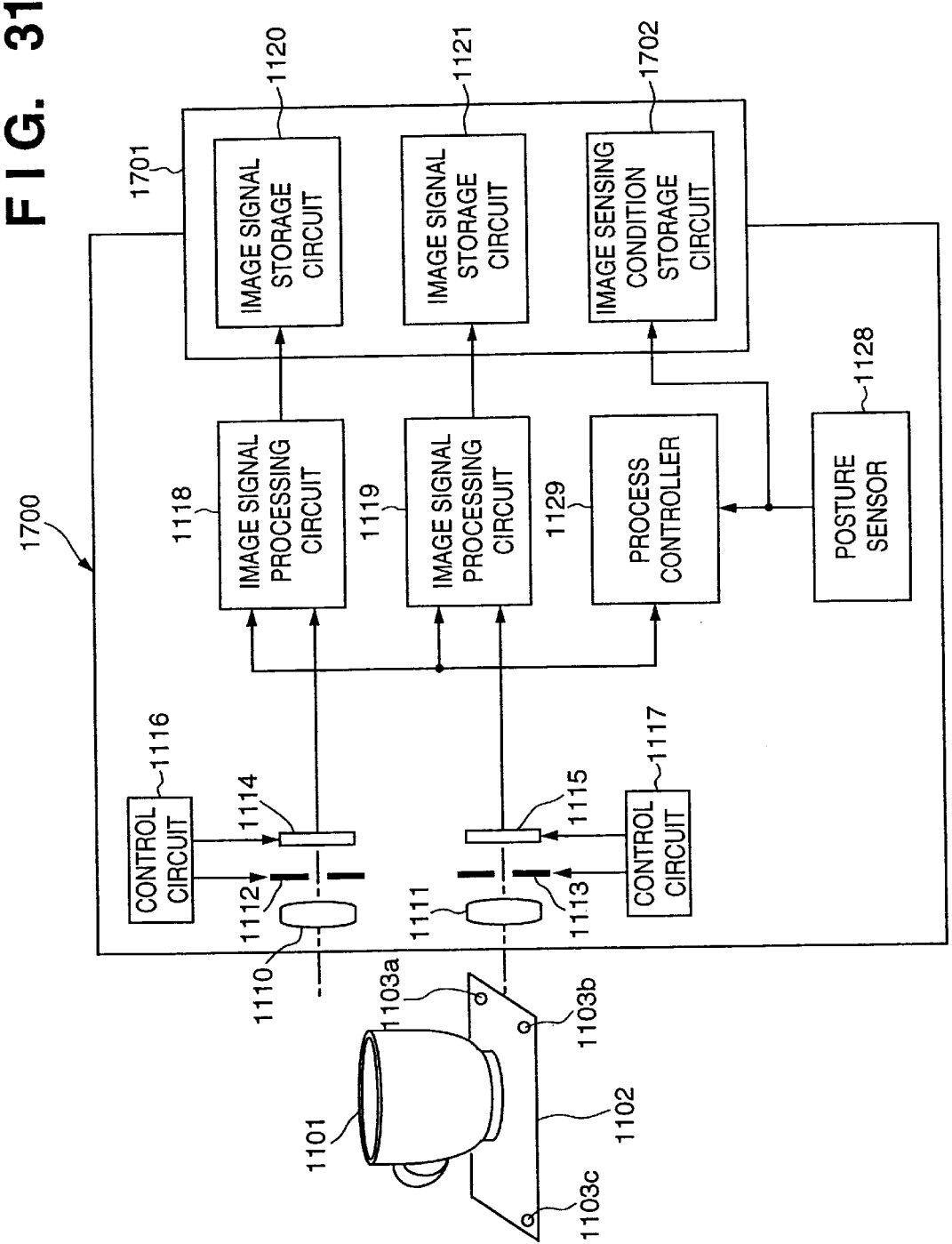
FIG. 31 is a block diagram showing the arrangement and use state of an image sensing apparatus according to the fourth modification.

FIG. 31 is a diagram showing the arrangement and operation principle upon acquisition of images of an image sensing apparatus 1700 according to the fourth modification, and the same reference numerals in FIG. 31 denote the same parts as in FIG. 25 of the third embodiment described above. The differences in FIG. 31 from FIG. 25 are that circuits associated with stereoscopic image analysis such as the corresponding point extraction circuit 1122, image sensing parameter detection circuit 1123, ROM 1124, three-dimensional information unifying circuit 1125, buffer circuits 1126 and 1127, and the like are omitted from the arrangement shown in FIG. 25, and an image sensing condition storage circuit 1702 is added to the arrangement in FIG. 25.

In the fourth embodiment, the image signal storage circuits 1120 and 1121 are housed in a storage unit 1701, which is detachable from the image sensing apparatus 1700, together with the image sensing condition storage circuit 1702, and upon completion of image sensing, the storage unit 1701 can be detached and carried.

In the image sensing apparatus 1700 according to the fourth modification, the image sensing positions and angles detected by the posture sensor 1128 are stored in the image sensing condition storage circuit 1702 simultaneously with the sensed images.

Since other arrangements and operations in the image sensing apparatus 1700 according to the fourth modification are the same as those in the image sensing apparatus 1100 according to the third embodiment, a detailed description thereof will be omitted.

Figure 32:
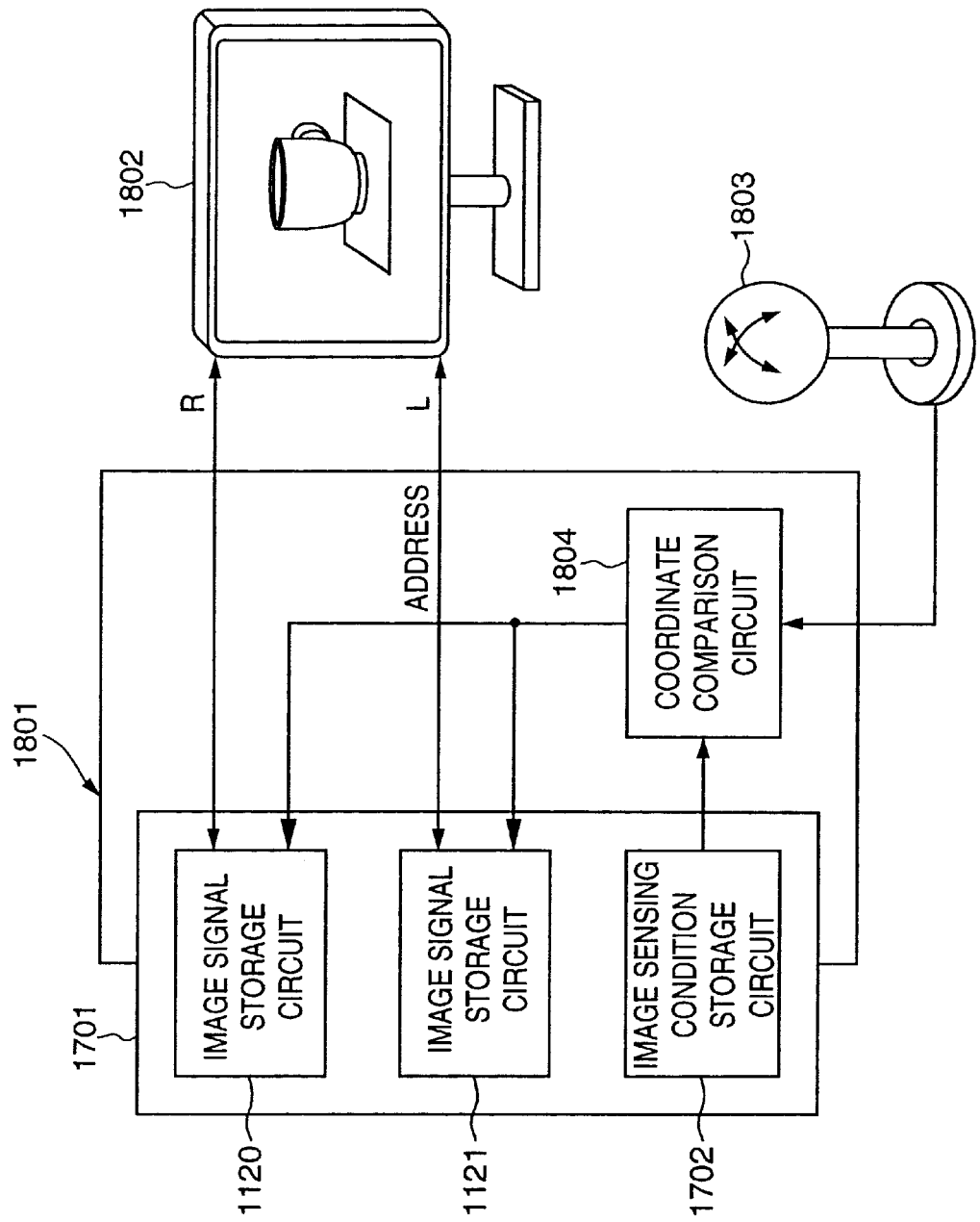
FIG. 32 is a block diagram showing the arrangement of a stereoscopic image display means in the fourth modification.

FIG. 32 shows the arrangement of an image display means for displaying an image sensed by the image sensing apparatus 1700.

In FIG. 32, reference numeral 1801 denotes an image reproduction unit; 1802, a stereoscopic display; 1803, a three-dimensional mouse; and 1804, a coordinate comparison circuit. The storage unit 1701 stores images around the object 1101, and their image sensing directions and positions. When the operator designates the observation direction of the object 1101 using the three-dimensional mouse 1803, the coordinate comparison circuit 1804 checks if an image in the designated observation direction is stored in the image sensing condition storage circuit 1702. If an image in the designated observation direction is stored, image data are read out from the image signal storage circuits 1120 and 1121 and are displayed on the stereoscopic display 1803. On the other hand, if an image in the designated observation direction is not stored, an image closest to the designated image is retrieved, and is displayed on the stereoscopic display 1803.

Since such image sensing/display system does not calculate a stereoscopic image as numerical value information but selects and displays an image in the view point direction desired by the operator, an object image which is discrete but is viewed virtually from an arbitrary direction can be instantaneously displayed. Hence, the operator can feel as if an actual object were present there.

As described above, according to the image sensing apparatus 1700 of the fourth modification, even when the operator does not move the apparatus at a constant speed around the object, images can be properly input at appropriate positions. Accordingly, a display image relatively close to that in the direction designated by the observer can always be presented.

As many apparently widely different embodiments of the present invention can be made without departing from the spirit and scope thereof, it is to be understood that the invention is not limited to the specific embodiments thereof except as defined in the appended claims.

What is claimed is:

1. An image sensing method comprising:

the image sensing step of sensing images of an object;

the storage step of storing image information of the object;

the image sensing condition detection step of detecting a relative relationship between the object and an image sensing apparatus main body; and the control step of controlling a storage operation of the image information, wherein the control step includes the step of controlling the storage operation in the storage step in accordance with a detection result of the image sensing condition detection step.

2. The method according to claim 1, wherein the control step includes the step of controlling to store information associated with the relative relationship between the object and the image sensing apparatus main body together with sensed images sensed in the image sensing step in the storage step.

3. The method according to claim 1, wherein the image sensing condition detection step includes the step of detecting the relative relationship using a sensor for detecting an angle and translation movement of the image sensing apparatus main body.

4. The method according to claim 1, wherein the image sensing condition detection step includes the step of analyzing an object image and images around the object sensed by the image sensing apparatus main body, and detecting an angle and translation movement of the image sensing apparatus main body on the basis of changes in state of sensed images sensed in the image sensing step.

5. The method according to claim 1, wherein the image sensing condition detection step includes the step of analyzing an object image and images around the object sensed by the image sensing apparatus main body, and detecting changes in relative position relationship between the object and the image sensing apparatus main body on the basis of an error signal generated upon analyzing the images.

6. The method according to claim 1, wherein the image sensing condition detection step includes the step of analyzing an object image sensed by the image sensing apparatus main body, and detecting changes in occlusion state of the object.

7. The method according to claim 1, wherein the image sensing condition detection step includes the step of analyzing an object image sensed by the image sensing apparatus main body, and detecting an overlapping region area between time-serial object images.

8. The method according to claim 1, wherein the image sensing condition detection step includes the step of analyzing an object image sensed by the image sensing apparatus main body, and detecting changes in distance image of the object.

9. The method according to claim 1, wherein the image analysis step includes the step of performing an analysis calculation for acquiring a three-dimensional shape and a surface image of the object using a plurality of images.

10. An image sensing method comprising:

the image sensing step of sensing images of an object;

the analysis step of analyzing image information obtained in the image sensing step;

the image sensing condition detection step of detecting a relative relationship between the object and an image sensing apparatus main body; and the control step of controlling an image analysis operation in the analysis step, wherein the control step includes the step of controlling the image analysis operation in accordance with a detection result of the image sensing condition detection step.

11. The method according to claim 10, wherein the analysis step includes the step of performing an analysis calculation for acquiring a three-dimensional shape and a surface image of the object using a plurality of images.

12. The method according to claim 10, wherein the image sensing condition detection step uses a sensor for detecting an angle and translation movement of the image sensing apparatus main body.

13. The method according to claim 10, wherein the image sensing condition detection step includes the step of analyzing an object image and images around the object sensed by the image sensing apparatus main body, and detecting an angle and translation movement of the image sensing apparatus main body on the basis of changes in state of sensed images sensed in the image sensing step.

14. The method according to claim 10, wherein the image sensing condition detection step includes the step of analyzing an object image and images around the object sensed by the image sensing apparatus main body, and detecting changes in relative position relationship between the object and the image sensing apparatus main body on the basis of an error signal generated upon analyzing the images.

15. The method according to claim 10, wherein the image sensing condition detection step includes the step of analyzing an object image sensed by the image sensing apparatus main body, and detecting changes in occlusion state of the object.

16. The method according to claim 10, wherein the image sensing condition detection step includes the step of analyzing an object image sensed by the image sensing apparatus main body, and detecting an overlapping region area between time-serial object images.

17. The method according to claim 10, wherein the image sensing condition detection step includes the step of analyzing an object image sensed by the image sensing apparatus main body, and detecting changes in distance image of the object.

18. The method according to claim 10, wherein the image sensing condition detection step includes the step of stopping the image sensing step and the analysis step during a period in which neither storage processing nor analysis processing are performed.

19. An image sensing apparatus comprising:

image sensing means for sensing images of an object;

storage means for storing image information of the object;

image sensing condition detection means for detecting a relative relationship between the object and an image sensing apparatus main body; and control means for controlling said storage means, wherein the control means controls said storage means in accordance with an output from said image sensing condition detection means.

20. The apparatus according to claim 19, wherein said control means controls said storage means to store information associated with the relative relationship between the object and the image sensing apparatus main body together with sensed images sensed by said image sensing means.

21. The apparatus according to claim 19, wherein said image sensing condition detection means comprises a sensor for detecting an angle and translation movement of the image sensing apparatus main body.

22. The apparatus according to claim 19, wherein said image sensing condition detection means analyzes an object image and images around the object sensed by the image sensing apparatus main body, and detects an angle and translation movement of the image sensing apparatus main body on the basis of changes in state of sensed images sensed by said image sensing means.

23. The apparatus according to claim 19, wherein said image sensing condition detection means analyzes an object image and images around the object sensed by the image sensing apparatus main body, and detects changes in relative position relationship between the object and the image sensing apparatus main body on the basis of an error signal generated upon analyzing the images.

24. The apparatus according to claim 19, wherein said image sensing condition detection means analyzes an object image sensed by the image sensing apparatus main body, and detects changes in occlusion state of the object.

25. The apparatus according to claim 19, wherein said image sensing condition detection means analyzes an object image sensed by the image sensing apparatus main body, and detects an overlapping region area between time-serial object images.

26. The apparatus according to claim 19, wherein said image sensing condition detection means analyzes an object image sensed by the image sensing apparatus main body, and detects changes in distance image of the object.

27. An image sensing apparatus comprising:

image sensing means for sensing images of an object;

image analysis means for analyzing image information sensed by said image sensing means;

image sensing condition detection means for detecting a relative relationship between the object and an image sensing apparatus main body; and control means for controlling said image analysis means, wherein said control means controls said image analysis means in accordance with an output from said image sensing condition detection means.

28. The apparatus according to claim 27, wherein said image analysis means performs an analysis calculation for acquiring a three-dimensional shape and a surface image of the object using a plurality of images.

29. The apparatus according to claim 27, wherein said image sensing condition detection means comprises a sensor for detecting an angle and translation movement of the image sensing apparatus main body.

30. The apparatus according to claim 27, wherein said image sensing condition detection means analyzes an object image and images around the object sensed by the image sensing apparatus main body, and detects an angle and translation movement of the image sensing apparatus main body on the basis of changes in state of sensed images sensed by said image sensing means.

31. The apparatus according to claim 27, wherein said image sensing condition detection means analyzes an object image and images around the object sensed by the image sensing apparatus main body, and detects changes in relative position relationship between the object and the image sensing apparatus main body on the basis of an error signal generated upon analyzing the images.

32. The apparatus according to claim 27, wherein said image sensing condition detection means analyzes an object image sensed by the image sensing apparatus main body, and detects changes in occlusion state of the object.

33. The apparatus according to claim 27, wherein said image sensing condition detection means analyzes an object image sensed by the image sensing apparatus main body, and detects an overlapping region area between time-serial object images.

34. The apparatus according to claim 27, wherein said image sensing condition detection means analyzes an object image sensed by the image sensing apparatus main body, and detects changes in distance image of the object.

35. The apparatus according to claim 27, wherein said image sensing condition detection means stops operations of said image sensing means and said image analysis means during a period in which neither storage processing nor analysis processing are performed.

* * * * *

UNITED STATES PATENT AND TRADEMARK OFFICE
CERTIFICATE OF CORRECTION

PATENT NO.   : 6,823,080 B2
DATED        : November 23, 2004
INVENTOR(S)  : Iijima et al.

It is certified that error appears in the above-identified patent and that said Letters Patent is hereby corrected as shown below:

<u>Title page,</u>
Item [75], Inventors, delete:
"Katsumi Iijima; Hachioji, JP" and insert therefore -- Katsumi Iijima; Tokyo, JP --;
"Shigeki Okauchi, Kodaira, JP" and insert therefore -- Shigeki Okauchi, Tokyo, JP --;
"Kotaro Yano, Yokohama, JP" and insert therefore -- Kotaro Yano, Kanagawa, JP --;
"Sunao Kurahashi, Kawasaki, JP" and insert therefore -- Sunao Kurahashi, Kanagawa, JP --;
"Katsuhiko Mori, Kwawsaki, JP" and insert therefore -- Katsuhiko Mori, Kanagawa, JP --;
"Motohiro Ishikawa, Yokohama, JP" and insert therefore -- Motohiro Ishikawa, Kanagawa, JP --;

Signed and Sealed this

Twenty-sixth Day of July, 2005

JON W. DUDAS
*Director of the United States Patent and Trademark Office*